United States Patent
Zhang et al.

(10) Patent No.: US 8,929,275 B2
(45) Date of Patent: Jan. 6, 2015

(54) METHOD, ENODEB, AND RELAY NODE FOR UN SUBFRAME CONFIGURATION PROCESSING

(71) Applicant: Huawei Technologies Co., Ltd., Shenzhen, Guangdong (CN)

(72) Inventors: Liangliang Zhang, Beijing (CN); Yajuan Li, Beijing (CN); Junren Chang, Beijing (CN); Li Chai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 13/660,568

(22) Filed: Oct. 25, 2012

(65) Prior Publication Data

US 2013/0044675 A1 Feb. 21, 2013

Related U.S. Application Data

(63) Continuation of application No. PCT/CN2010/075795, filed on Aug. 9, 2010.

(30) Foreign Application Priority Data

Apr. 30, 2010 (CN) .......................... 2010 1 0168703

(51) Int. Cl.
*H04B 7/14* (2006.01)
*H04B 7/155* (2006.01)
*H04W 76/04* (2009.01)
*H04W 84/04* (2009.01)

(52) U.S. Cl.
CPC .............. *H04B 7/1555* (2013.01); *H04B 7/155* (2013.01); *H04W 76/041* (2013.01); *H04W 84/047* (2013.01)

USPC .......................................................... 370/315

(58) Field of Classification Search
CPC ... H04B 7/155; H04B 7/1555; H04W 76/041; H04W 84/047
USPC .......................................... 370/312, 315, 331
See application file for complete search history.

(56) References Cited

U.S. PATENT DOCUMENTS

2007/0153734 A1 7/2007 Lee et al.
2008/0188224 A1* 8/2008 Pani et al. ..................... 455/436

(Continued)

FOREIGN PATENT DOCUMENTS

| CN | 101030802 A | 9/2007 |
|---|---|---|
| CN | 101651950 A | 2/2010 |
| CN | 101651971 A | 2/2010 |
| WO | WO 2009/109076 A1 | 9/2009 |

OTHER PUBLICATIONS

Written Opinion of the International Searching Authority dated Feb. 17, 2011 in connection with International Patent Application No. PCT/CN2010/075795.

(Continued)

*Primary Examiner* — Gary Mui

(57) ABSTRACT

A method and a relay node (RN) for Un subframe configuration processing are disclosed. The method includes: receiving, by an RN, a radio resource control (RRC) reconfiguration message sent by an eNodeB (eNB), where the RRC reconfiguration message includes subframe reconfiguration information of the RN; and applying, by the RN, a RRC reconfiguration immediately upon reception of the RRC reconfiguration message, and applying a Un subframe reconfiguration. The foregoing technical solution can implement the Un subframe configuration of the eNB and the RN and improve communication quality.

12 Claims, 14 Drawing Sheets

(56) References Cited

U.S. PATENT DOCUMENTS

| | | | |
|---|---|---|---|
| 2011/0242970 A1* | 10/2011 | Prakash et al. | 370/225 |
| 2011/0261747 A1* | 10/2011 | Wang et al. | 370/315 |
| 2011/0269448 A1* | 11/2011 | Chen | 455/422.1 |
| 2012/0094699 A1* | 4/2012 | Tamura et al. | 455/458 |
| 2012/0236782 A1* | 9/2012 | Bucknell et al. | 370/315 |
| 2013/0003640 A1* | 1/2013 | Yang et al. | 370/312 |
| 2013/0143574 A1* | 6/2013 | Teyeb et al. | 455/438 |
| 2013/0250773 A1* | 9/2013 | Ohta et al. | 370/241 |

OTHER PUBLICATIONS

International Search Report dated Feb. 17, 2011 in connection with International Patent Application No. PCT/CN2010/075795.

Partial translation of Office Action dated Apr. 3, 2013 in connection with Chinese Patent Application No. 201010168703.7.

Supplementary European Search Report dated Feb. 25, 2013 in connection with European Patent Application No. EP 10 85 0545.

"MBSFN subframe configuration in the RN", CATT, 3GPP TSG RAN WG2 meeting #69, Feb. 22-26, 2010, 3 pages.

"Summary of Email discussion [69#31] LTE: Relay configuration at startup/subframe reconfiguration", Panasonic, 3GPP TSG-RAN WG2 Meeting #69_bis, Apr. 12-16, 2010, 9 pages.

"Consideration on the timing relationship between Un reconfiguration and Un S1 update", ZTE, 3GPP TSG RAN WG2 #69bis, 3 pages.

Draft Report of 3GPP TSG RAN WG2 meeting #70, ETSI MCC, May 10-14, 2010, 154 pages.

"RAN3 agreed changes to TS 36.300", Ericsson, 3GPP TSG WG2 Meeting #62, May 5-9, 2008, 124 pages.

\* cited by examiner

METHOD, ENODEB, AND RELAY NODE FOR UN SUBFRAME CONFIGURATION PROCESSING

CROSS-REFERENCE TO RELATED APPLICATIONS

This application is a continuation of International Application No. PCT/CN2010/075795, filed on Aug. 9, 2010, which claims priority to Chinese Patent Application No. 201010168703.7, filed on Apr. 30, 2010, both of which are hereby incorporated by reference in their entireties.

TECHNICAL FIELD

The present invention relates to the field of communications technologies, and in particular, to a method, an eNodeB, and a relay node for Un subframe configuration processing.

BACKGROUND

In order to meet the high requirement of an IMT-Advanced (International Mobile Telecommunications-Advanced) system for system capacity, it is necessary to find an available wideband spectrum in a high frequency band, but the signal transmission in the high frequency band generally has the defects of great path loss and penetration loss, so that an LTE-A (LTE-Advance) system uses a relay (Relay) technology to improve system capacity and coverage.

The relay technology is to divide a radio link between an eNB and a terminal into two links, namely, a radio link between the eNB and an RN and a radio link between the RN and the terminal, so that there is an opportunity to replace one link of poor quality with two links of good quality, so as to obtain higher link capacity and coverage. With the LTE-A as an example, an RN (Relay Node) accesses a network via a donor eNodeB (DeNB); the RN supports a user equipment (User Equipment, UE) of the LTE (Long Term Evolution, long term evolution) system; as seen from the LTE UE, the RN is equivalent to an LTE eNB, and an interface between the RN and the eNB is a Un interface, and an interface between the terminal and the RN is a Uu interface.

In order to avoid self-interference, the RN generally cannot send and receive signals in the same frequency band, so that a Un subframe of the RN generally includes two parts: One is a control part for sending a signal to the terminal and another is a data part for receiving a signal sent by the eNB. Therefore, the Un subframe needs to be transmitted on the Uu interface and the Un interface. As from the view of the terminal of the RN, the RN is an eNB, and the Un subframe configuration on the Un interface is a multicast broadcast single frequency network (Multicast Broadcast Single Frequence Network, MBSFN) subframe configuration on the Uu interface. In an LTE system in the prior art, the eNB notifies the terminal of the MBSFN subframe configuration by means of system information, so that in a relay system, the MBSFN subframe configuration is notified between the RN and the UE by means of system information. The system information may be divided into a master information block (MasterInfomationBlock, MIB) and a system information block (SystemInfomationBlock, SIB). When the Un subframe configuration is to be changed, accordingly the RN needs to notify, by means of system information, the UE of the change of the subframe configuration on the Uu interface (as from the view of the terminal, that is a change of the MBSFN subframe configuration). In addition, in the prior art, most of system information modification periods of the eNB are configurable, and the system information modification periods are configured in system information.

In the prior art, the eNB needs to notify its terminal of the update of the system information, and meanwhile, broadcast updated system information to the terminal at a next system information modification period boundary. Therefore, for the RN, when obtaining the Un subframe (re)configuration, the RN can execute the Un subframe (re)configuration only after a certain period. Specifically, the period is a system information modification period of the eNB and a system information modification period of the RN.

The prior art has at least the following problem: because the eNB and the RN use respective system information modification periods and the system information modification period of the RN, the Un subframe configuration time of the RN cannot be determined.

SUMMARY

Embodiments of the present invention provide a method, an eNB, and an RN for Un subframe configuration processing.

An embodiment of the present invention provides a method for Un subframe configuration processing, including: receiving, by an RN, a radio resource control (RRC) reconfiguration message sent by an eNB, where the RRC reconfiguration message includes subframe reconfiguration information of the RN; and applying, by the RN, a RRC reconfiguration and applying a Un subframe reconfiguration immediately upon reception of the RRC reconfiguration message.

An embodiment of the present invention also provides an RN, including: a module, adapted to receive a radio resource control RRC reconfiguration message sent by an eNB, where the RRC reconfiguration message includes subframe reconfiguration information of the RN; and a module, adapted to apply a RRC reconfiguration and apply a Un subframe reconfiguration immediately upon reception of the RRC reconfiguration message.

An embodiment of the present invention also provides a communication system, including: an eNB, adapted to send a radio resource control RRC reconfiguration message to an RN, where the RRC reconfiguration message includes subframe reconfiguration information of the RN; and the RN, adapted to apply a RRC reconfiguration and apply a Un subframe reconfiguration immediately upon reception of the RRC reconfiguration message.

BRIEF DESCRIPTION OF THE DRAWINGS

To make the technical solutions of the embodiments of the present invention or the prior art clearer, the accompanying drawings used in the description of the embodiments or the prior art are briefly described below. Evidently, the accompanying drawings illustrate some exemplary embodiments of the present invention and persons skilled in the art may obtain other drawings based on these drawings without creative efforts.

DETAILED DESCRIPTION

The technical solutions of the embodiments of the present invention are hereinafter described clearly with reference to the accompanying drawings in the embodiments of the present invention. It is evident that the described embodiments are some exemplary embodiments of the present invention, rather than all embodiments of the present invention. All other embodiments that persons skilled in the art obtain without creative efforts based on the embodiments of the present invention also fall within the protection scope of the present invention.

Figure 1:
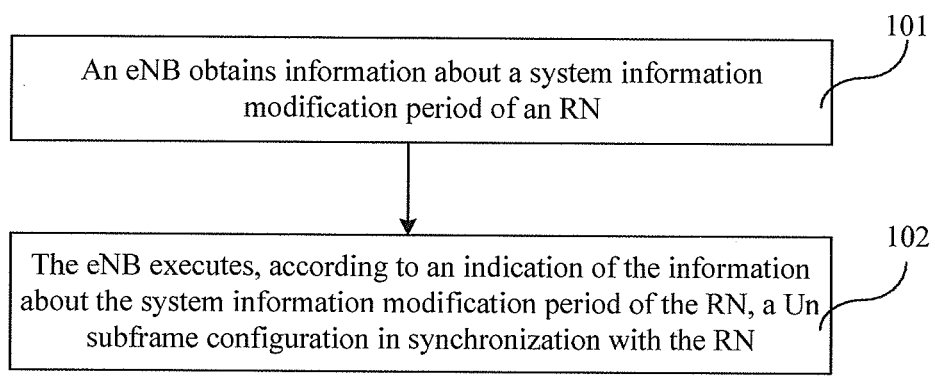
FIG. 1 is a schematic flowchart of an embodiment of a method for Un subframe configuration processing according to the present invention.

With respect to the disadvantage of the prior art that a Un subframe configuration cannot be applied synchronously between an eNB and an RN, thus decreasing communication quality, an embodiment of the present invention provides a method for Un subframe configuration processing. FIG. 1 is a schematic flowchart of a first embodiment of a method for Un subframe configuration processing according to the present invention. As shown in FIG. 1, the method includes the following steps:

Step 101: An eNB obtains information about a system information modification period of an RN. This step is that in a communication system with an RN, the eNB obtains the information about the system information modification period of the RN, and with respect to different implementations, the obtaining of the information about the system information modification period of the RN by the eNB may specifically include several cases. For example, the eNB may configure the system information modification period of the RN for the RN and send the system information modification period of the RN to the RN; or the RN may configure the system information modification period of the RN and send the system information modification period of the RN to the eNB, so that the eNB obtains the system information modification period of the RN; or an operation, administration, and maintenance system (OAM) or an operation and maintenance system (O&M) generates, by a configuration, the system information modification period of the RN and sends the system information modification period of the RN to the eNB; or the RN and the eNB may determine the system information modification period of the RN through negotiation.

Step 102: The eNB executes, according to an indication of the information about the system information modification period of the RN, a Un subframe configuration in synchronization with the RN; in this step, after the eNB knows the system information modification period of the RN, the eNB may execute the Un subframe configuration at a Un subframe configuration execution time preset by the eNB and the RN, that is, in the $N^{th}$ system information modification period of the RN, or may receive an indication returned by the RN that the Un subframe configuration is to be executed in the $N^{th}$ system information modification period of the RN, coordinate the Un subframe configuration between the eNB and the RN, and implement a synchronous execution of the Un subframe configuration between the eNB and the RN. In addition, the synchronous execution in the foregoing embodiment of the present invention may not be synchronization in an absolute time sense. For example, the synchronous execution may be frame synchronization, that is, a certain offset time that may be indicated by an offset may be allowed between the eNB and the RN. For example, the subframe 1 of the eNB corresponds to the subframe 2 of the RN, so that the subframe offset between the eNB and the RN is 1.

In the foregoing embodiment of the present invention, the eNB obtains the information about the system information modification period of the RN, and the eNB executes the Un subframe configuration in synchronization with the RN according to the obtained system information modification period of the RN, which not only implements the synchronization between the eNB and the RN in terms of the Un subframe configuration processing, but also can further improve communication quality. The Un subframe configuration in each embodiment of the present invention includes two cases: one refers to the process of an initial Un subframe configuration during the access to a system, and the other refers to a configuration process when the Un subframe configuration information is updated, which is also referred to as a Un subframe configuration. That is, the Un subframe configuration in the embodiments of the present invention may be a Un subframe reconfiguration or an initial Un subframe configuration.

The Un subframe may specifically be an MBSFN subframe used for a multimedia broadcast multicast service, and the configuration information of the MBSFN subframe may be notified to a UE by system information SIB2. In another system, the information about the system information modification period of the RN in the foregoing embodiment may be information about an initially set system information modification period of the RN, or may be information about a subsequently updated system information modification period of the RN. And, the information about the system information modification period of the RN may specifically include a modification period coefficient and a basic paging cycle, and the system information modification period of the RN is determined by the product of the modification period coefficient and the basic paging cycle, that is, the system information modification period of the RN=the modification period coefficient x the basic paging cycle, where the value range of the modification period coefficient is 1, 2, 4, 8, and so on, while the value range of the basic paging cycle may be 320 ms, 640 ms, 1280 ms, 2560 ms, and so on. The modification period, for example, may also be indicated by $(2^{n-1} \times n \times 320)$ ms, where n is a positive integer, and the specific values of the modification period coefficient and the basic paging cycle may be broadcasted to the UE by system information.

In addition, the execution of the Un subframe configuration in synchronization with the RN by the eNB according to the information about the system information modification period of the RN in step 102 may specifically include:

sending, by the eNB, a message including the Un subframe configuration information to the RN; and executing, by the eNB, the Un subframe configuration in synchronization with the RN, where the time for executing the Un subframe configuration may be the $N^{th}$ system information modification period of the RN after the eNB sends the message including the Un subframe configuration information, for example, the first or second system information modification period of the RN after the eNB sends the message including the Un subframe configuration information, and the execution time may be preset. And in specific implementation, the execution in the $N^{th}$ system information modification period of the RN may be an execution at a boundary, or a start point, of the system information modification period.

Figure 2:
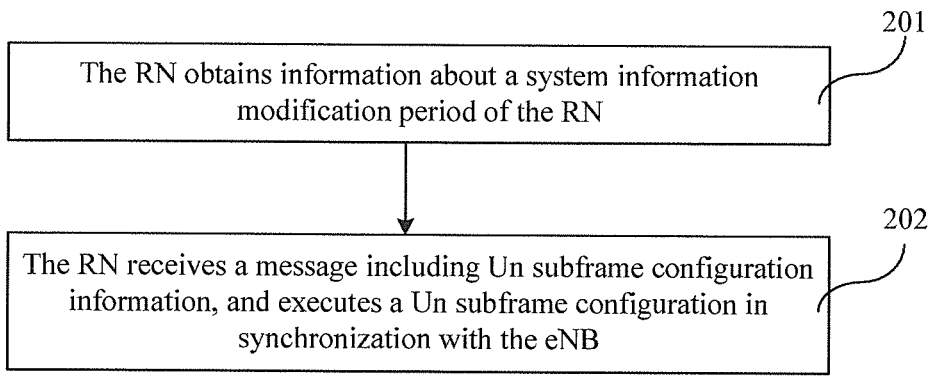
FIG. 2 is a schematic flowchart of another embodiment of a method for Un subframe configuration processing according to the present invention.

The foregoing embodiment is an embodiment of a method for Un subframe configuration processing on the eNB side. In addition, a method for Un subframe configuration processing on the RN side may be shown in FIG. 2. FIG. 2 is a schematic flowchart of a second embodiment of a method for Un subframe configuration processing according to the present invention. The method includes the following steps:

Step 201: The RN obtains information about a system information modification period of the RN. Corresponding to the embodiment as shown in FIG. 1, the system information modification period of the RN may be sent by the eNB to the RN, or generated by a configuration by the RN, or notified by the OAM/O&M to the RN, or finally generated by a configuration by the RN according to the configuration information provided by the OAM/O&M; and when the OAM/O&M notifies the RN of the system information modification period of the RN or the RN generates, by a configuration, the system information modification period of the RN, the RN also sends a message including information about the system information modification period of the RN to the eNB. When the information about the system information modification period of the RN is sent by the eNB to the RN, the RN receives the message that is sent by the eNB and includes the information about the system information modification period of the RN; at this time, the information about the system information modification period of the RN may be configured by the eNB, or notified by the OAM/O&M to the eNB, or finally generated by a configuration by the eNB according to the configuration information of the OAM/O&M.

Step 202: The RN receives a message including Un subframe configuration information, and executes, according to an indication of the information about the system information modification period of the RN, a Un subframe configuration in synchronization with the eNB.

In this embodiment, the eNB generates, by a configuration, the system information modification period of the RN, or after the RN generates, by a configuration, the system information modification period of the RN, the RN sends the system information modification period of the RN to the eNB, or the OAM/O&M notifies the RN of the system information modification period of the RN and the RN sends the system information modification period of the RN to the eNB, or the OAM/O&M notifies the eNB of the system information modification period of the RN and the eNB sends the system information modification period of the RN to the RN, all of which can enable the eNB and the RN to preset the execution time of the Un subframe configuration according to the system information modification period of the RN, or the eNB receives a message indicated by the RN that the Un subframe configuration is to be applied in a particular system information modification period of the RN, so that after the RN receives the Un subframe configuration information sent by the eNB, the RN executes the Un subframe configuration in synchronization with the eNB.

The reception of the message including the Un subframe configuration information by the RN in step 202 may specifically be as follows:

the RN receives the message that is sent by the eNB and includes the Un subframe configuration information, where the Un subframe configuration information is generated by a configuration by the eNB or the OAM/O&M; or the RN receives the message that is sent by the OAM/O&M and includes the Un subframe configuration information, where the Un subframe configuration information is generated by a configuration by the OAM/O&M. The specific execution time of the Un subframe configuration may be the next system information modification period of the RN after the RN receives the message that is sent by the eNB and includes the Un subframe configuration information, so that step 202 may specifically be as follows:

2021: The RN receives the message including the Un subframe configuration information;

2022: In the current system information modification period of the RN in which the message that is sent by the eNB and includes the Un subframe configuration information is received, the RN sends to the UE a message including a Un subframe configuration update indication, which may be, for example, a paging message or an SIB1 message;

2023: The RN executes the Un subframe configuration in synchronization with the eNB in the next system information modification period of the RN after sending the message including the Un subframe configuration update indication. That is, the RN executes the Un subframe configuration in synchronization with the eNB in the next system information modification period of the RN after the current system information modification period of the RN in which the message including the Un subframe configuration information is received.

Figure 3:
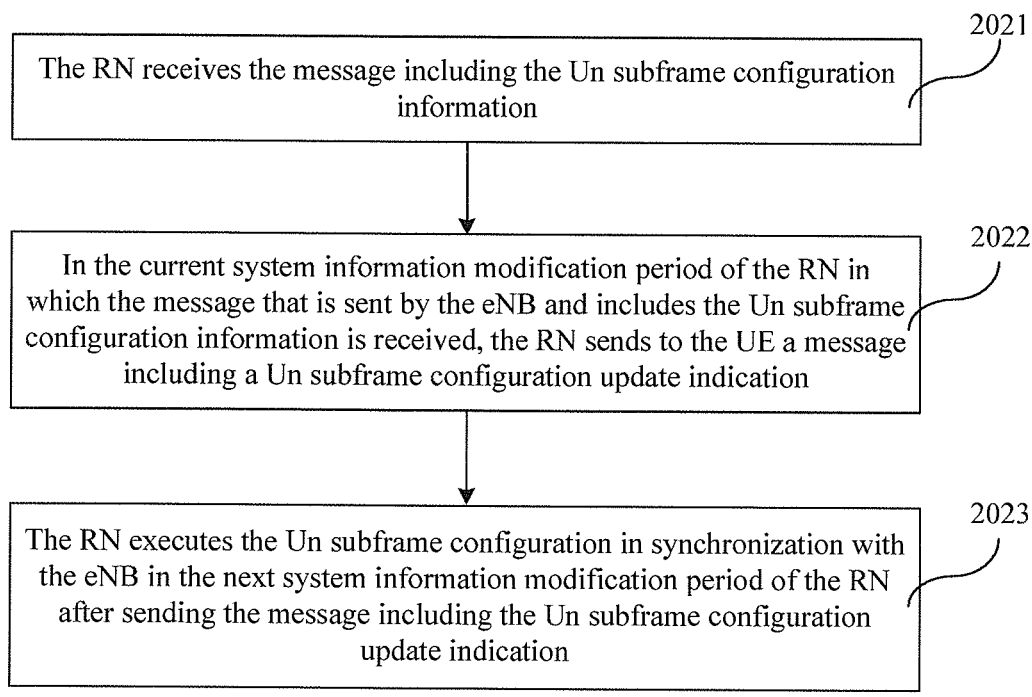
FIG. 3 is a flowchart of a Un subframe configuration in an embodiment of a method for Un subframe configuration processing.

The foregoing steps may specifically be shown in FIG. 3.

In addition, the Un subframe configuration may be preset to be executed in the next second system information modification period of the RN after the RN receives the message that is sent by the eNB and includes the Un subframe configuration information, so that step 202 may specifically be as follows:

2031: The RN receives the message including the Un subframe configuration information;

2032: The RN sends the message including the Un subframe configuration update indication to the UE in the next system information modification period of the RN after receiving the message including the Un subframe configuration information;

2033: The RN executes the Un subframe configuration in synchronization with the eNB in the next system information modification period of the RN after sending the message including the Un subframe configuration update indication.

That is, the RN executes the Un subframe configuration in synchronization with the eNB in the second system information modification period of the RN after the current system information modification period of the RN in which the message including the Un subframe configuration information is received. The second system information modification period of the RN is a special example of the next $(X+1)^{th}$ system information modification period of the RN, where X is a positive integer.

Figure 4:
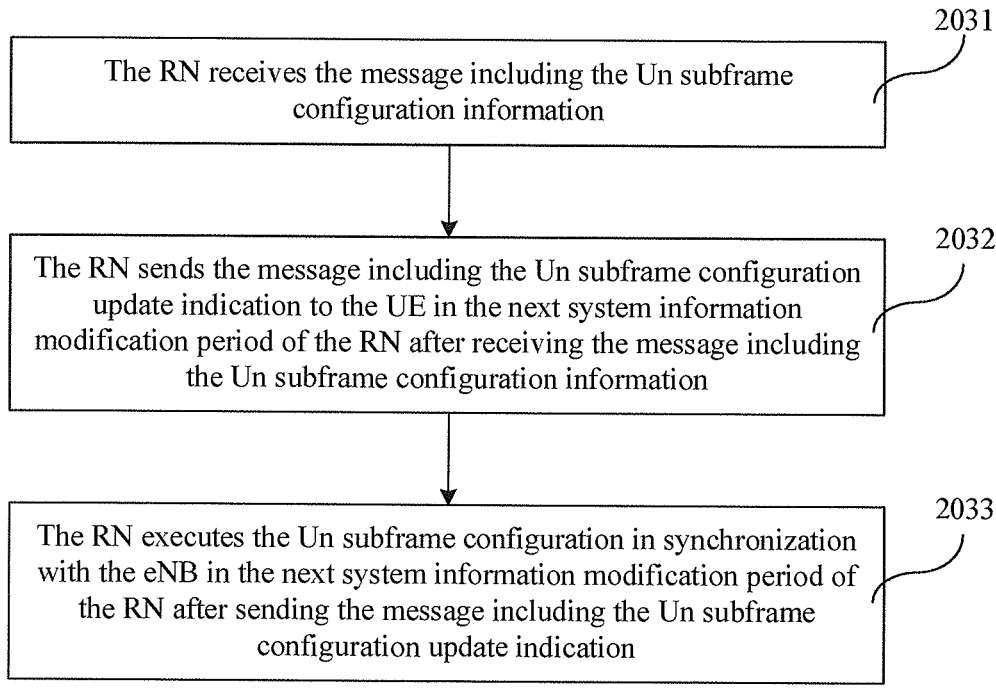
FIG. 4 is a flowchart of a Un subframe configuration in another embodiment of a method for Un subframe configuration processing.

Refer to FIG. 4 for details.

In the foregoing embodiments of the present invention, the RN respectively sends the message including the Un subframe configuration update indication in the current period in which the message including the Un subframe configuration information is received or in the next period after the message including the Un subframe configuration information is received, and persons skilled in the art may also understand that the configuration may also be set, according to the actual condition of the system, to be executed at another time, such as in the $X^{th}$ period where X is a positive integer.

In addition, after the message including the Un subframe configuration update indication is sent, the Un subframe configuration in synchronization with the eNB is generally executed in the next system information modification period of the RN. In addition, there is another implementation, that is, the RN may send an indication message to the eNB to notify the eNB of applying a Un subframe configuration in synchronization with the RN. Specifically, step 202 is as follows:

Step 2041: The RN receives the message including the Un subframe configuration information.

Step 2042: The RN judges the system information modification period of the RN in which the message including the Un subframe configuration update indication is sent to the UE; if it is judged that the message including the Un subframe configuration update indication can be sent to the UE in the current system information modification period of the RN, step 2043 is executed, and if it is judged that the message including the Un subframe configuration update indication can be sent to the UE in the next system information modification period of the RN, step 2044 is executed.

Step 2043: Send to the eNB a message indicating that the Un subframe configuration is to be applied in the next system information modification period of the RN.

Step 2044: Send to the eNB a message indicating that the Un subframe configuration is to be applied in the second system information modification period of the RN.

Figure 5:
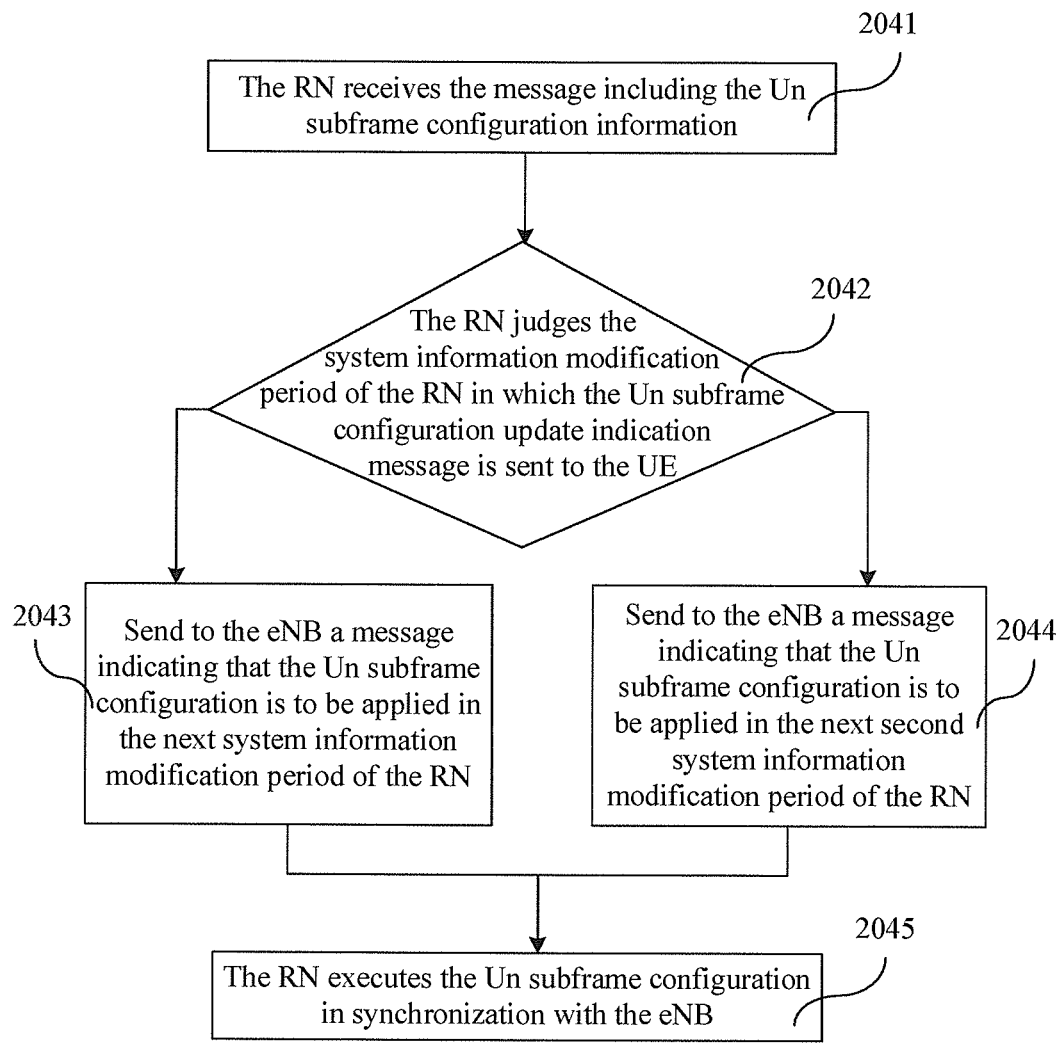
FIG. 5 is a flowchart of a Un subframe configuration in still another embodiment of a method for Un subframe configuration processing.

Step 2045: The RN executes the Un subframe configuration in synchronization with the eNB. Refer to FIG. 5 for details.

In addition, in the embodiment where the RN sends an indication message to the eNB to instruct the eNB to apply the Un subframe configuration in synchronization with the RN, the steps may also be as follows: the next system information modification period of the RN after the RN receives the message including the Un subframe configuration information is preset to be the configuration execution time between the eNB and the RN, so that if the RN judges that the message including the Un subframe configuration update indication can be sent to the UE in the current system information modification period of the RN, the execution of the Un subframe configuration may be implemented in the next period and because this is consistent with the preset condition, it is unnecessary to send to the eNB the message indicating that the Un subframe configuration is to be applied in the next system information modification period of the RN; if the RN judges that the message including the Un subframe configuration update indication can be sent to the UE in the next system information modification period of the RN, the Un subframe configuration is to be executed at least in the subsequent second system information modification period of the RN, so that it is necessary to send to the eNB a message indicating that the Un subframe configuration is to be applied in the second system information modification period of the RN after sending the indication.

In addition, when the configuration execution time preset between the eNB and the RN is the second system information modification period of the RN after the RN receives the message including the Un subframe configuration information, if the RN judges that the message including the Un subframe configuration update indication can be sent to the UE in the current system information modification period of the RN, the execution of the Un subframe configuration may be implemented in the next period, and because this is inconsistent with the preset condition, it is necessary to send to the eNB a message indicating that the Un subframe configuration is to be applied in the next system information modification period of the RN; if the RN judges that the message including the Un subframe configuration update indication can be sent to the UE in the next system information modification period of the RN, because the execution time is consistent with the preset execution time, it is unnecessary to send to the eNB a message indicating that the Un subframe configuration is to be applied in the second system information modification period of the RN after sending the indication.

Figure 6:
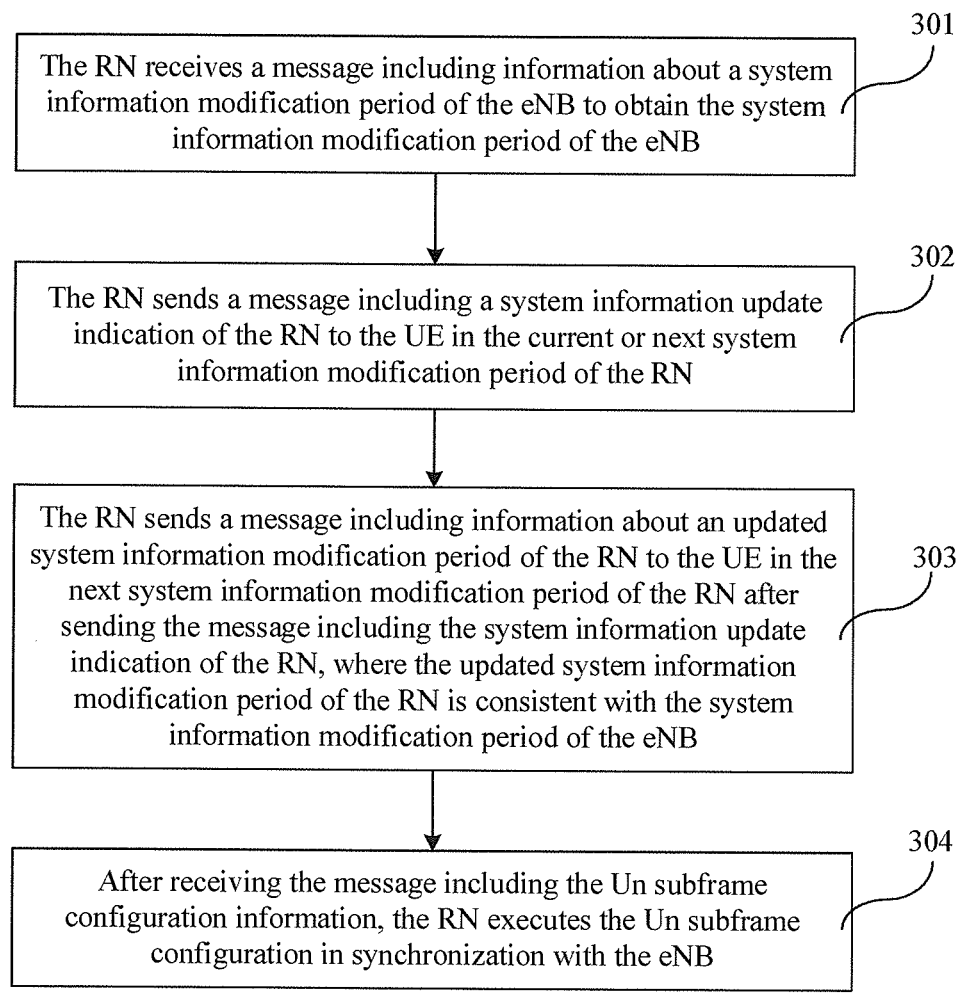
FIG. 6 is a schematic flowchart of still another embodiment of a method for Un subframe configuration processing according to the present invention.

As compared with the foregoing method where the eNB obtains the system information modification period of the RN so that the eNB applies the Un subframe configuration in synchronization with the RN, an embodiment of the present invention also provides a method for Un subframe configuration processing. FIG. 6 is a schematic flowchart of a third embodiment of a method for Un subframe configuration processing according to the present invention. As shown in FIG. 6, the method includes the following steps:

Step 301: The RN receives a message including information about a system information modification period of the eNB to obtain the system information modification period of the eNB.

Step 302: The RN sends a message including a system information update indication of the RN to the UE in the current or next system information modification period of the RN.

Specifically, in this step, the UE may be notified by using a Paging message or system information SIB1, for example, the RN sends the Paging message to a terminal of the RN for notifying the terminal of a change or an update on system information, but which system information is updated is not indicated in the paging message. If the terminal receives the paging message (including a system information modification systemInfoModification item), the terminal learns that the system information is to be modified at the next modification period boundary (the next modification period boundary). Then, the terminal receives new system information at the next modification period boundary (the next modification period boundary), where the new system information includes the specific content of the system information update; or the RN uses a broadcast SIB1 message to notify the terminal that the system information is to be updated, where the SIB1 message includes a parameter "value tag: systemInfoValueTag" used for indicating whether the system information is updated. The so-called next modification period boundary in each embodiment of the present invention may be understood as a start point of the next modification period. The so-called next system information modification period of the RN in each embodiment of the present invention may be understood as the next modification period boundary or the start point of the next modification period.

Step 303: The RN sends a message including information about an updated system information modification period of the RN to the UE in the next system information modification period of the RN after sending the message including the system information update indication of the RN, where the updated system information modification period of the RN is consistent with the system information modification period of the eNB.

Step 304: After receiving the message including the Un subframe configuration information, the RN executes the Un subframe configuration in synchronization with the eNB. Specifically, for this step, refer to corresponding steps in the implementations as shown in FIG. 3 to FIG. 5.

In the foregoing embodiment of the present invention, the system information modification period of the RN is configured to be consistent with the system information modification period of the eNB, so that both the eNB and the RN can preset, according to the system information modification period of the RN (which is also the system information modification period of the eNB), the time for executing the Un subframe configuration; or a message indicated by the RN that the Un subframe configuration is to be applied in a particular system information modification period of the RN (which is also the system information modification period of the eNB) is received, so that after receiving the Un subframe configuration information sent by the eNB, the RN can execute the Un subframe configuration in synchronization with the eNB.

Specifically, when step 304 is executed, the execution time of the Un subframe configuration may be preset between the RN and the eNB, for example, the next system information modification period of the eNB after the RN receives the message that is sent by the eNB and includes the Un subframe configuration information may be preset to be the configuration execution time (at this time, the system information modification period of the RN and the system information modification period of the eNB are consistent). Regarding the specific steps for the RN to receive the Un subframe configuration information sent by the eNB and to execute the Un subframe configuration in synchronization with the eNB in step 304, refer to the embodiment shown in FIG. 3.

Alternatively, the second system information modification period of the eNB after the RN receives the message that is sent by the eNB and includes the Un subframe configuration information may be preset to be the configuration execution time (at this time, the system information modification period of the RN and the system information modification period of the eNB are consistent). Refer to the embodiment shown in FIG. 4 for the specific steps.

In addition, the time for executing the Un subframe configuration may also not be preset between the RN and the eNB, that is, the RN may send an indication message to the eNB to notify the eNB of applying the Un subframe configuration in synchronization with the RN. Refer to the embodiment shown in FIG. 5 for details.

In addition, the eNB may also configure the system information modification period of the RN to be the same as the system information modification period of the eNB, and one message bit may be used to indicate whether the system information modification period of the RN is allowed to be configured to be consistent with the system information modification period of the eNB. After the indication bit information is obtained, if the indication bit information indicates that the system information modification period of the eNB should be kept consistent with the system information modification period of the RN, the system information modification period of the RN is set to be consistent with the system information modification period of the eNB. For example, when the bit value is 1, it indicates that the configuration of the system information modification period of the RN needs to be consistent with that of the system information modification period of the eNB, and when the bit value is 0, the configuration of the system information modification period of the RN needs to be inconsistent with that of the system information modification period of the eNB.

There is another case that the RN obtains the Un subframe configuration information and the information about the system information modification period of the eNB in the same modification period. In this case, the reception of the message including the system information modification period of the eNB by the RN and the reception of the message including the Un subframe configuration information by the RN in the foregoing embodiment are completed in the same system information period of the RN; and further, when the RN sends the updated information about the system information modification period of the RN to the UE, the RN also sends information about the MBSFN subframe configuration on the Uu interface to the UE (because the subframe configuration of the Uu interface that is caused by the Un subframe configuration of the Un interface is an MBSFN subframe configuration as seen from a terminal of the RN). The updated information about the system information modification period of the RN and the information about the MBSFN subframe configuration on the Uu interface (which is the MBSFN subframe configuration information as seen from the terminal of the RN) may be sent to the terminal by system information such as SIB2.

In the foregoing embodiment, the indication bit information may also be set, and the indication bit information is used for indicating whether the system information modification period of the eNB should be kept consistent with the system information modification period of the RN, so that the steps also include:

setting, by the RN, its own system information modification period to be consistent with the system information modification period of the eNB only when the RN identifies that the indication bit information indicates that the system information modification period of the eNB should be kept consistent with the system information modification period of the RN.

Figure 7:
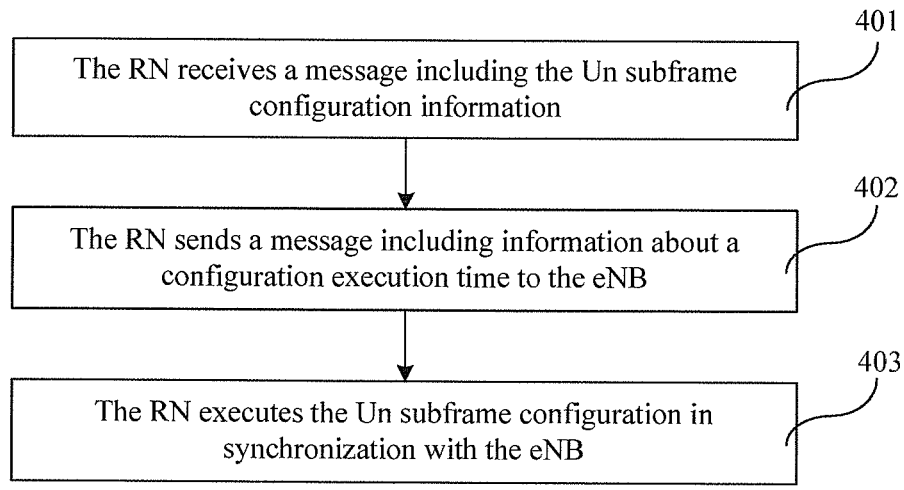
FIG. 7 is a schematic flowchart of still another embodiment of a method for Un subframe configuration processing according to the present invention.

An embodiment of the present invention also provides a method for implementing a synchronous Un subframe configuration between the RN and the eNB. FIG. 7 is a schematic flowchart of a fourth embodiment of a method for Un subframe configuration processing according to the present invention. In the embodiment of the present invention, the eNB configures the system information modification period of the RN. As shown in FIG. 7, the method includes the following steps:

Step 401: The RN receives a message including the Un subframe configuration information.

Step 402: The RN sends a message including information about a configuration execution time to the eNB.

Step 403: The RN executes the Un subframe configuration in synchronization with the eNB.

In the method for Un subframe configuration processing according to the foregoing embodiment of the present invention, after the RN receives the message including the Un subframe configuration information and determines the time for executing the Un subframe configuration, the RN sends the message including the information about the configuration execution time to the eNB, so that the RN and the eNB can execute the Un subframe configuration synchronously. The indication message may be carried in an existing message. The RN uses a step and a message in an existing procedure, and sends this message carrying the indication information to the eNB. Of course, the indication message may also be a new message.

In specific implementation, the information about the configuration execution time according to the foregoing embodiment may be an absolute frame number, a relative frame number, the $N^{th}$ system information modification period of the RN after the current system information modification period of the RN, or the $M^{th}$ system information modification period of the eNB after the current system information modification period of the eNB, where M and N are positive integers, for executing the configuration. Thus, step 403 may specifically be: the RN executes the Un subframe configuration in synchronization with the eNB according to the information about the configuration execution time.

The embodiment illustrated in FIG. 7 may also be as follows: after the RN obtains the information about the Un subframe reconfiguration, the RN determines when to execute the Un subframe configuration; the RN sends an indication message to the eNB to indicate to the eNB that a reconfiguration can be executed; and the eNB executes the reconfiguration process in the next $N^{th}$ frame or in the $N^{th}$ frame (a relative frame number, an absolute frame number) or in the next $N^{th}$ system information modification period or in the $N^{th}$ system information modification period after receiving the indication.

The indication message may: include the execution time, such as in the next $N^{th}$ frame or in the $N^{th}$ frame (a relative frame number, an absolute frame number), or in the next $N^{th}$ system information modification period or in the $N^{th}$ system information modification period; or the indication message does not include specific execution time, and after receiving the indication, the eNB executes the reconfiguration process in the next $N^{th}$ frame or in the $N^{th}$ frame (a relative frame number, an absolute frame number) or in the next $N^{th}$ system information modification period or in the $N^{th}$ system information modification period. Here, the next $N^{th}$ frame means, with reference to a current frame, the $N^{th}$ frame after the current frame. The $N^{th}$ frame here is indicated by a relative frame number or an absolute frame number, that is, no reference to a frame is made, and instead, a frame number for executing the reconfiguration is directly carried in the message. This embodiment imposes no limitation in this regard.

The indication message may be one message in the prior art. The RN uses a step and a message in the existing procedure, and the RN sends this message carrying the indication information to the eNB. Of course, the indication message may also be a new message.

The embodiment in FIG. 7 does not limit whether the eNB knows the modification period of the RN. The eNB may or may not know the modification period of the RN.

For the embodiment in FIG. 7, especially for the case that there are several RNs, after step 402 is completed, the eNB judges whether the execution times fed back by the RNs are the same, and if the execution times are different, the eNB needs to send information about one determined common execution time to the RNs. After that, step 403 is executed.

In each embodiment of the present invention, the eNB and the RN generally have the capability to calculate the time for a message sent by the eNB and the RN to reach a target network element.

Figure 8:
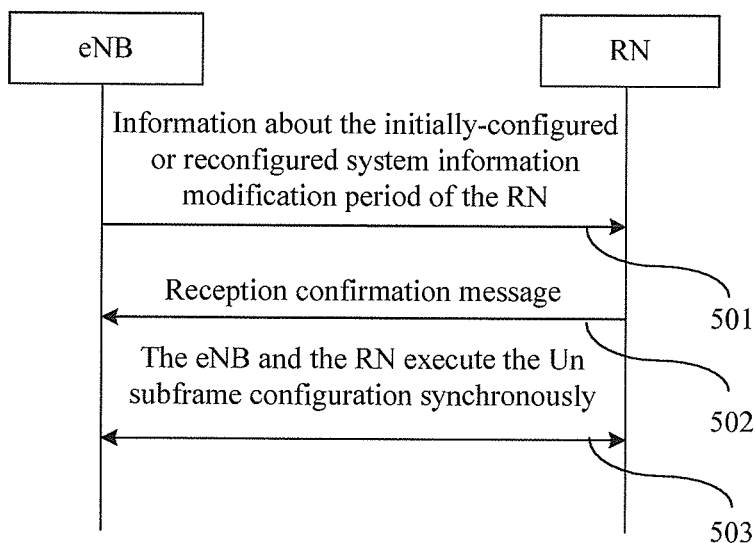
FIG. 8 is a schematic flowchart of still another embodiment of a method for Un subframe configuration processing according to the present invention.

The following are several specific embodiments of a method for Un subframe configuration processing according to the present invention. FIG. 8 is a schematic flowchart of a first specific embodiment of the present invention. As shown in FIG. 8, the embodiment includes the following steps:

Step 501: The eNB sends the information about the initially-configured or reconfigured system information modification period of the RN to the RN. Specifically, the information may be sent by a dedicated RRC (radio resource control, Radio Resource Control) message, and the content of this message may be as follows: the system information modification period MP of the RN is a product of modificationPeriodCoeff and defaultPagingCycle, where the modificationPeriodCoeff is an integer whose value range is [1, 2, 4, 8 . . . ], the value range of the defaultPagingCycle is [320 ms, 640 ms, 1280 ms, 2560 ms . . . ], and both the modificationPeriodCoeff and the defaultPagingCycle are sent by dedicated messages to the RN or multiple RNs under the eNB. The way for sending the messages may be unicast or multicast. The length of the MP should ensure that all UEs can correctly receive paging messages.

The step may, for example, be executed during the access of the RN or during the RRC reconfiguration.

The system information modification period of the RN may be generated by a configuration by the eNB or by the OAM/O&M system, and when the system information modification period of the RN is generated by a configuration by the OAM/O&M system, the OAM/O&M system may directly send the system information modification period of the RN to the RN, or the OAM/O&M system may send the generated Un subframe configuration information to the eNB first and then the eNB forwards the generated Un subframe configuration information to the RN, or the eNB and the RN may negotiate with each other, so that the RN obtains the final Un subframe (re) configuration information, and so on.

Step 502: The RN responds with a reception confirmation message to confirm that the system information modification period of the RN that is configured by the eNB is received. This step is optional.

Step 503: The eNB and the RN execute the Un subframe reconfiguration synchronously. A time for executing the Un subframe reconfiguration may be set by default: for example, the Un subframe reconfiguration may be executed in the $N^{th}$ system information modification period of the RN after the eNB sends the Un subframe configuration information to the RN, where N may be a positive integer such as 1, 2, and 3. In addition, the Un subframe reconfiguration may also be executed in the $N^{th}$ frame by default. The RN obtains the Un subframe configuration information which may also be the configuration information at the time of the initial Un subframe configuration or the configuration information at the time of reconfiguration. In the current system information modification period of the RN in which the RN obtains the Un subframe configuration information, the RN can send paging information to notify the terminal of the RN that the system information is updated, so that the RN can update its subframe configuration on the Uu interface (MBSFN subframe configuration) in the next system information modification period of the RN. The configuration in the embodiment of the present invention includes two cases including an initial configuration and a reconfiguration.

And specifically, the eNB may send an RRC or MAC layer message carrying the Un subframe configuration information to the RN. And the Un subframe configuration information may be generated by a configuration by the eNB or by the OAM/O&M system, and when the Un subframe configuration information is generated by a configuration by the OAM/O&M system, the OAM/O&M system may directly send the Un subframe configuration information to the RN, or the OAM/O&M system may send the generated Un subframe configuration information to the eNB first and then the eNB sends the generated Un subframe configuration information to the RN, or the eNB and the RN may negotiate with each other, so that the RN obtains the final Un subframe configuration information.

In the next period (a special example of the next $X^{th}$ period, where X is a positive integer) after the RN obtains the Un subframe configuration information, the RN sends a paging message to the UE of the RN to notify the terminal that the system information is updated. After that, the RN starts to send broadcast system information to the terminal of the RN in the next second period (a special example of the next $(X+1)^{th}$ period, where X is a positive integer), where the system information includes the updated MBSFN subframe (Un subframe) configuration information. If the original MBSFN subframe configuration in the Uu interface is the third subframe, the content of the system information is updated to the new MBSFN subframe configuration starting from the next second period after the RN obtains the Un subframe configuration information, for example, the third subframe and the sixth subframe, and this new configuration is started to be executed from the next second period after the RN obtains the Un subframe configuration information.

In this way, the eNB and the RN execute the Un subframe (re) configuration in the next second period after the current system information modification period of the RN in which the RN obtains the Un subframe configuration information.

Figure 9:
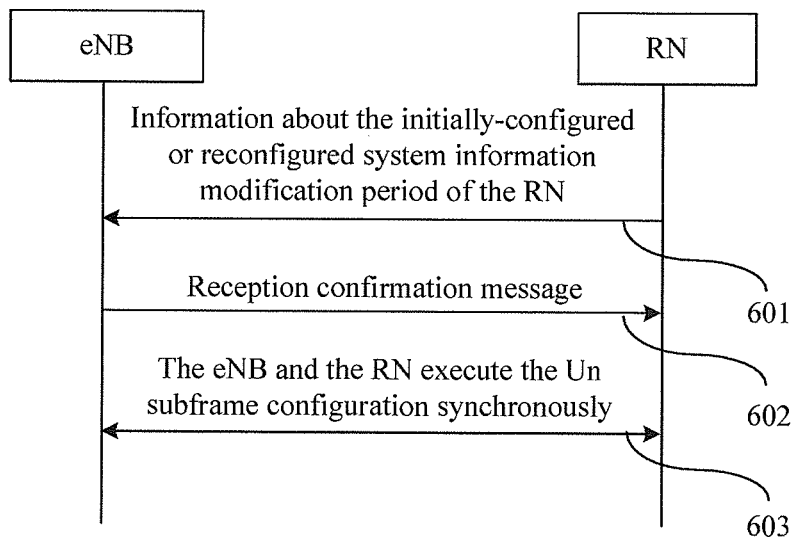
FIG. 9 is a schematic flowchart of still another embodiment of a method for Un subframe configuration processing according to the present invention.

FIG. 9 is a schematic flowchart of a second specific embodiment of the present invention. As shown in FIG. 9, the embodiment includes the following steps:

Step 601: The RN sends the initially-configured or reconfigured system information modification period of the RN to the eNB; specifically, at the time of the initial configuration, the RN may notify the eNB of the configuration of the system information modification period of the RN by a capability report message, or the RN may notify the eNB by an RRC reconfiguration complete message; and when the system information modification period of the RN is updated, the RN notifies the eNB of the information by an RRC message.

The system information modification period of the RN may be an initially-configured system information modification period of the RN, or a reconfigured system information modification period of the RN, or an updated system information modification period of the RN.

Step 602: Optionally, the eNB may respond with a reception confirmation message to confirm that the system information modification period of the RN is received.

Step 603: The eNB and the RN execute the Un subframe configuration synchronously. For the specific execution process, refer to step 503 in the foregoing embodiment. Therefore, the eNB and the RN execute the Un subframe configuration in the next second system information modification period of the RN after the RN obtains the Un subframe configuration information.

Figure 10:
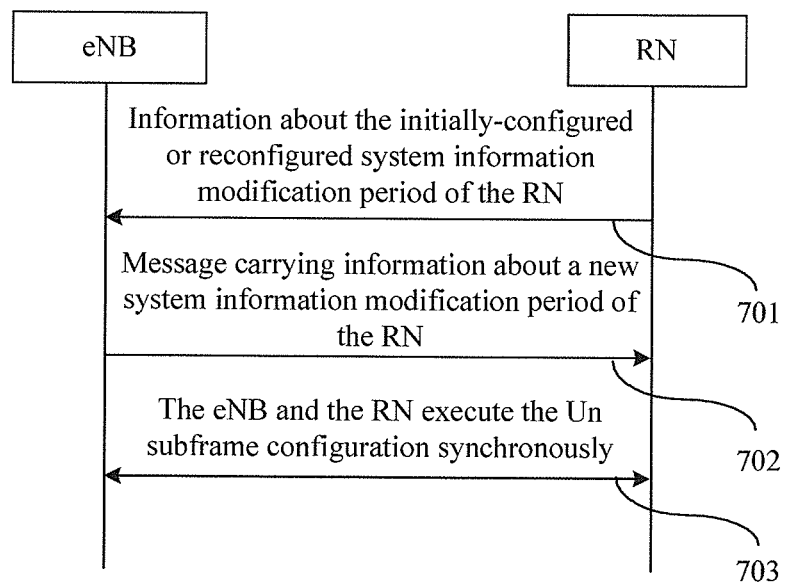
FIG. 10 is a schematic flowchart of still another embodiment of a method for Un subframe configuration processing according to the present invention.

FIG. 10 is a schematic flowchart of a third specific embodiment of the present invention. In this embodiment, the RN generates, by a configuration, the system information modification period of the RN, and the RN and the eNB negotiate and finally determine the system information modification period of the RN. As shown in FIG. 10, the embodiment includes the following steps:

Step 701 is the same as step 601 in the foregoing embodiment.

Step 702: The eNB receives a message that is sent by the RN and includes information about a new system information modification period of the RN, where the new system information modification period of the RN is configured by the RN. Specifically, after receiving the system information modification period of the RN that is sent by the eNB, the RN may determine the new system information modification period of the RN according to the number of terminals belonging to the RN, the traffic information, and so on.

Step 703 is the same as step 503 in the embodiment shown in FIG. 8.

Figure 11:
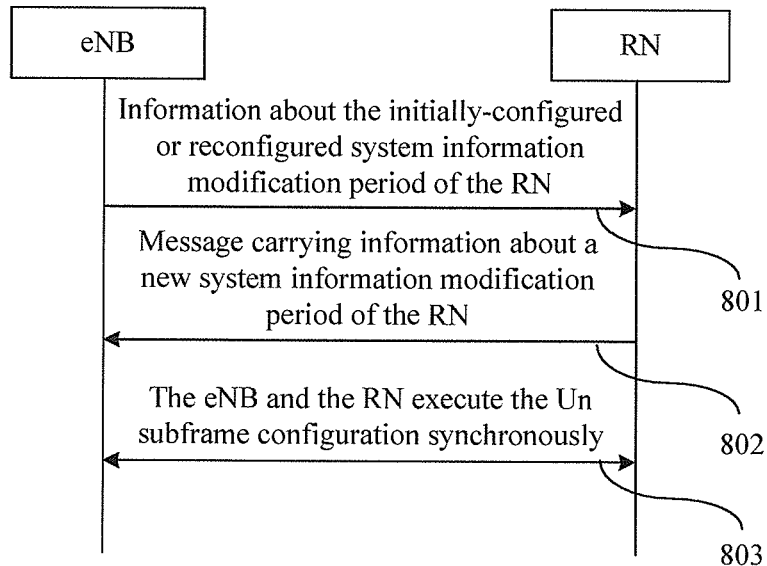
FIG. 11 is a schematic flowchart of still another embodiment of a method for Un subframe configuration processing according to the present invention.

FIG. 11 is a schematic flowchart of a fourth specific embodiment of the present invention. In this embodiment, the eNB generates, by a configuration, the system information modification period of the RN, and the RN and the eNB negotiate and finally determine the system information modification period of the RN. As shown in FIG. 11, the embodiment includes the following steps:

Step 801 is the same as step 501 in the embodiment shown in FIG. 8.

Step 802: The RN receives a message that is sent by the eNB and carries information about a new system information modification period of the RN, where the new system information modification period of the RN is configured by the eNB after the eNB receives a message carrying a system information modification period of the RN. For example, the new system information modification period of the RN may be determined according to the number of terminals belonging to the RN, the traffic information, and so on.

Step 803: The eNB and the RN execute the Un subframe configuration synchronously. For the specific execution process, refer to step 503 in the embodiment shown in FIG. 8.

Figure 12:
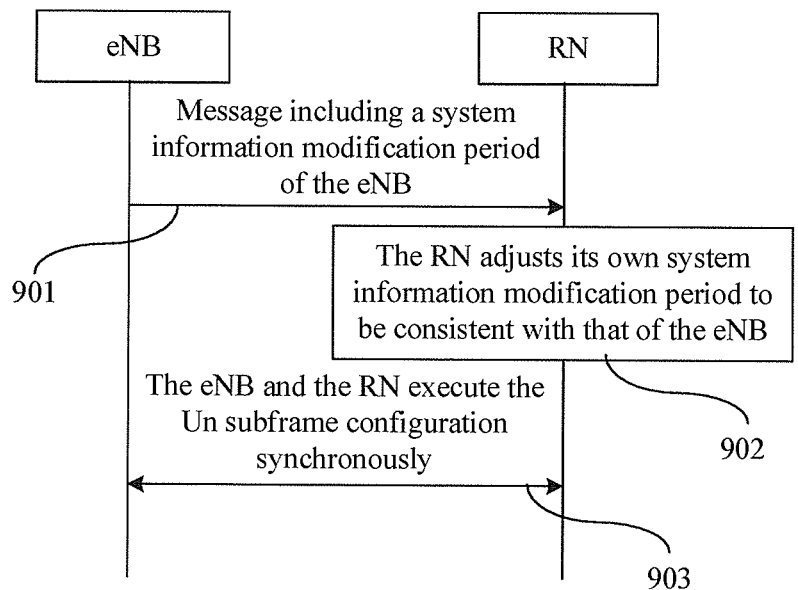
FIG. 12 is a schematic flowchart of still another embodiment of a method for Un subframe configuration processing according to the present invention.

FIG. 12 is a schematic flowchart of a fifth specific embodiment of the present invention. In this embodiment, the RN receives a message or an RRC message sent by the eNB and obtains a system information modification period of the eNB from the message, and the RN sets its own system information modification period to be consistent with the system information modification period of the eNB. As shown in FIG. 12, the embodiment includes the following steps:

Step 901: The RN receives a message including a system information modification period of the eNB, such as an SI message or an RRC message, and obtains the system information modification period of the eNB from the message. And the message including the system information modification period of the eNB may be initial or updated. That is, this step is applicable to the case that the RN initially obtains the system information modification period of the eNB or the case that the RN obtains an updated system information modification period of the eNB.

With an RRC dedicated message as an example, for the RRC dedicated message, the RN receives the RRC dedicated message of the eNB in the $N^{th}$ period following the system information modification period of the RN, where the message includes the system information modification period of the eNB.

Step 902: The RN adjusts its own system information modification period to be consistent with that of the eNB.

a. Specifically, in the case of the RRC dedicated message, in the next $X^{th}$ period (for example, X=1, 2, 3 . . . ) after the current system information modification period of the RN in which the RN receives the message including the system information modification period of the eNB (with X=1 as an example here for further description), that is, in the $(N+1)^{th}$ period, the RN sends the message to its own UEs to notify the UEs that the system information modification period of the RN needs to be updated. Specifically, in this step, the UEs may be notified by using a Paging message or system information SIB1, for example, the RN broadcasts a Paging message to the terminal belonging to the RN, for notifying the terminal that the system information will be updated, but the paging message does not indicate which system information is updated, and the terminal receives new system information in the next modification period after receiving the paging message; or the RN notifies, by broadcasting an SIB1 message, the terminal that there is system information to be updated, where the SIB1 message includes a parameter "value tag: systemInfoValueTag" used for indicating whether the system information is updated.

In addition, for the case that the eNB updates the system information modification period of the eNB, additionally the eNB also sends broadcast system information to its own UEs to notify the UEs that the system information modification period needs to be updated.

b. In the next system information modification period of the RN after the RN sends a message to the UEs of the RN (Specifically, in this step, the UEs may be notified by using a Paging message or system information SIB1), that is, in the $(N+2)^{th}$ period (with x=1 as an example here, thus N+2 is applied; normally, N+x+1 should be applied), the RN sends broadcast system information to the UEs of the RN to notify the UEs of the system information update of the RN, where the content of the system information update includes the new system information modification period of the RN.

In addition, for the case that the eNB updates its own system information modification period, additionally the eNB also sends broadcast system information to the terminal of the eNB to notify the terminal of the system information update of the eNB, where the content of the system information update includes the new system information modification period of the eNB.

Step 903: The RN obtains the Un subframe configuration information, and the eNB and the RN execute the Un subframe configuration synchronously. For specific detailed steps, refer to FIG. 1, FIG. 2, FIG. 3, FIG. 4, or FIG. 5 of the embodiments. Particularly, regarding the process for the eNB and the RN to execute the Un subframe configuration synchronously, one may also refer to step 503 in the embodiment shown in FIG. 8.

There is another case that the RN obtains, in the same modification period, the Un subframe configuration information and the information about the system information modification period of the eNB:

Step 903a: The RN receives a message including the information about the system information modification period of the eNB, such as an SI message or an RRC message, and obtains the system information modification period of the eNB from the message.

In the current period (the $N^{th}$ period) in which the information about the system information modification period of the eNB is received, the RN also receives the Un subframe configuration information.

Regarding how the RN obtains the Un subframe configuration information, one may refer to the contents of other embodiments, such as FIG. 1, FIG. 2, FIG. 3, FIG. 4, FIG. 8, FIG. 9, FIG. 10, and FIG. 11 of the embodiments.

Step 903b: The RN adjusts the system information modification period of the RN to be consistent with that of the eNB, and executes the Un subframe configuration in synchronization with the eNB.

a. In the next $X^{th}$ period (such as X=1, 2, 3 . . . ) after the $N^{th}$ period, X=1 is taken as an example here for further description, and that is, in the $(N+1)^{th}$ period, the RN sends a message to the UEs of the RN to notify the UEs that the system information modification period of the RN needs to be updated. Specifically, in this step, the UEs may be notified by using a Paging message or system information SIB1.

In addition, for the case that the eNB updates the system information modification period of the eNB, additionally the eNB also sends broadcast system information to its own UEs to notify the UEs that the system information modification period needs to be updated.

b. In the $(N+2)^{th}$ period (with x=1 as an example here, thus N+2 is applied; normally, N+x+1 should be applied), the RN sends broadcast system information to the UEs of the RN to notify the UEs of the system information update of the RN, where the content of the system information update includes a new system information modification period of the RN and may also include a new MBSFN subframe configuration (the update of the Un subframe configuration also affects the MBSFN subframe configuration on the Uu interface, so that for the terminal of the RN, the MBSFN subframe configuration is a new MBSFN subframe configuration).

In addition, for the case that the eNB updates its own system information modification period, additionally the eNB also sends broadcast system information to the terminal of the eNB to notify the terminal of the system information update of the eNB, where the content of the system information update includes the new system information modification period of the eNB.

Therefore, for any configuration information that affects the Un interface configuration and the Uu interface configuration, such as the Un subframe configuration information or the configuration information of the system information modification period, the embodiments of the present invention may be used. No more enumeration is made here. Most of the embodiments of the present invention describe the problems by taking the Un subframe configuration information as an example. However, the embodiments of the present invention are not limited to the Un subframe configuration information.

In this embodiment, the adjustment of the system information modification period of the RN to be consistent with the system information modification period of the eNB may be that the system information modification period of the eNB is the same as the system information modification period of the RN, or may be that the system information modification period of the eNB and the system information modification period of the RN have a multiple relationship, for example, the system information modification period of the eNB is y times the system information modification period of the RN, or the system information modification period of the RN is y times the system information modification period of the eNB, where y may be an integer or a decimal, for example, y=1, 2, 3 . . . , or y=0.5, 1.5 . . . , for example, the modification period of the eNB is 1000 ms, and the modification period of the RN1 is 500 ms.

In addition, if there is more than one RN under one eNB in an RN network, the system information modification periods of the RNs may be kept consistent with that of the eNB; specifically, the system information modification periods of the RNs may be the same as that of the eNB. Alternatively, the modification periods of the RNs and the modification period of the eNB may have a multiple relationship by default, for example, the modification period of the eNB is 1000 ms, and the modification periods of the RNs are 250 ms; or the eNB gives a multiple, for example, the modification period of the eNB multiplied by x=0.5 is the modification periods of the RNs; this x may be adjusted flexibly, and the eNB can provide the RN (s) with the information about this multiple (for example, the eNB provides this multiple relationship during the access of the RN(s), or the eNB can reconfigure and adjust this x multiple and thus can notify this x multiple to the RN(s)).

Figure 13:
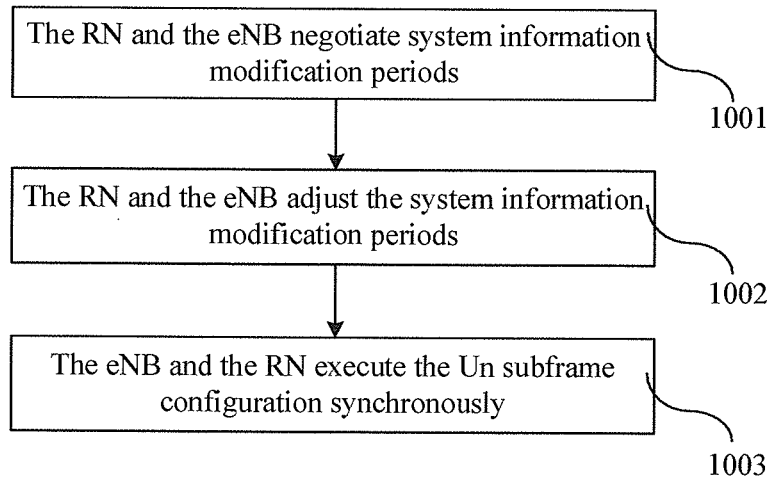
FIG. 13 is a schematic flowchart of still another embodiment of a method for Un subframe configuration processing according to the present invention.

In addition, if there is more than one RN under one eNB in the RN network, the cases that the system information modification periods of the RNs are inconsistent are as follows: the system information modification periods of the RNs are different, or the system information modification periods of the RNs are different but have a multiple relationship with each other. For example, the modification period of the eNB is 1000 ms, the modification period of the RN1 is 5000 ms, and the modification period of the RN2 is 250 ms. FIG. 13 is a schematic flowchart of a sixth specific embodiment of the present invention. In this embodiment, the RN and the eNB negotiate the system information modification period of the eNB and when the system information modification period of the eNB changes, the RN and the eNB notify each other to keep the system information modification periods of the RN and the eNB consistent. As shown in FIG. 13, the embodiment includes the following steps:

Step 1001: The RN and the eNB negotiate system information modification periods. For example, in the $(N-1)^{th}$ period, the RN and the eNB determine the system information modification periods through negotiation, that is, the system information modification period of the eNB and the system information modification period of the RN, and keep the two system information modification periods consistent.

Step 1002: The RN and the eNB adjust the system information modification periods. Specifically, this step may include the following substeps:

a. In the $N^{th}$ period, the RN sends broadcast system information to the UEs of the RN to notify the UEs that the system information of the RN is to be updated.

In addition, for the case that the eNB updates the system information modification period of the eNB, the eNB simultaneously sends broadcast system information to the UEs of the eNB to notify the UEs that the system information of the eNB is to be updated.

b. In the $(N+1)^{th}$ period, the RN sends broadcast system information to the UEs of the RN to notify the UEs of the system information update of the RN, where the content of the system information update includes a new system information modification period of the RN.

In addition, for the case that the eNB updates its own system information modification period, the eNB simultaneously sends broadcast system information to the UEs of the eNB to notify the UEs of the system information update of the eNB, where the content of the system information update includes the new system information modification period of the eNB.

Step 1003: The RN obtains the Un subframe reconfiguration, and the eNB and the RN execute the Un subframe reconfiguration synchronously. For specific detailed steps, refer to FIG. 1, FIG. 2, FIG. 3, FIG. 4, or FIG. 5 of the embodiments. Particularly, regarding the process for the eNB and the RN to execute the Un subframe configuration synchronously, one may also refer to step 503 in the embodiment as shown in FIG. 8.

The content of the embodiment of the present invention mainly takes the Un subframe configuration information as an example to describe the solution for the Un interface and the Uu interface to simultaneously execute this configuration. However, this solution is not limited to the Un subframe configuration information but may also be other configurations. As long as the Un interface and the Uu interface need to execute this configuration simultaneously, the solution of the present invention may be used. The configuration to be executed by the Un interface and the Uu interface simultaneously may also be the system information modification period of the RN or others.

Figure 14:
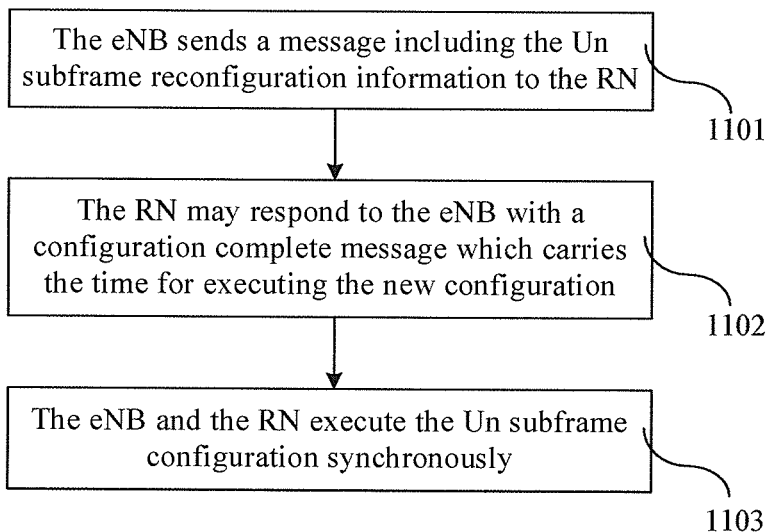
FIG. 14 is a schematic flowchart of still another embodiment of a method for Un subframe configuration processing according to the present invention.

FIG. 14 is a schematic flowchart of a seventh specific embodiment of the present invention. In this embodiment, a Un subframe reconfiguration complete message of the RN carries the configuration execution time. As shown in FIG. 14, the embodiment includes the following steps:

Step 1101: The eNB sends a message including the Un subframe reconfiguration information to the RN, where the message may be an RRC reconfiguration message, and a particular indication or a specific IE is carried in the Un subframe reconfiguration information, so that the RN can judge that it is a synchronous reconfiguration process, that is, the new configuration in the configuration information is not applied immediately.

Step 1102: After the RN receives the message, because the indication information is carried, the new configuration is not applied immediately, but the RN may respond to the eNB with a configuration complete message which carries the time for executing the new configuration, that is, the new configuration is to be executed at the boundary of the next or next second system information modification period (at the start point of the next or next second modification period of the BCCH of the RN); meanwhile, the RN also determines, according to the remaining time in the current system information modification period, whether the UEs of the RN are to be notified by using a Paging message in the current system information modification period of the RN or in the next system information modification period of the RN. In addition, the execution time of the new configuration in this step may be indicated by an SFN (system frame number, system frame number) or other integer types, or may be indicated by a relative time or an absolute time.

Step 1103: After the execution time arrives, that is, at the start point of the next or next second system information modification period, the UE also receives new information in a scheduling period of the BCCH corresponding to this time, and in addition, the eNB and the RN execute the Un subframe reconfiguration synchronously.

In the specific embodiments of the present invention, in the case of multiple relay nodes (RNs), if the eNB knows the system information modification periods of the RNs, specifically the following cases are included:

(1) The modification periods of the RNs are consistent (the modification periods are the same): the Un subframe configuration may be executed in an implicit way, that is, the RNs obtain the Un subframe configuration information and the RN executes the Un subframe configuration in the next $X^{th}$ period or the next $(X+1)^{th}$ period after the RN receives the information, such as the embodiments shown in FIG. 8, FIG. 9, FIG. 10 and FIG. 11; or the Un subframe configuration may be executed in an explicit way, such as the embodiments shown in FIG. 14 and FIG. 7.

(2) The modification periods of the RNs are inconsistent (the modification periods are different): the Un subframe configuration may also be executed in an explicit way, such as the embodiments shown in FIG. 7 and FIG. 14.

If the eNB does not need to know the modification periods of the RNs, specifically the following cases are included:

(1) The modification periods of the RNs are consistent (the modification periods are the same):

The Un subframe configuration may be executed in an implicit way, that is, the RNs may obtain the modification period of the eNB, and when the eNB sends an RRC message to the RN (s), the RNs execute the Un subframe reconfiguration in the $(N+X)/(N+X+1)^{th}$ modification period, such as the embodiments shown in FIG. 12 and FIG. 13. In this case, the modification periods of the RNs may be kept consistent with the modification period of the eNB, and the modification periods of the RNs and the modification period of the eNB are the same; or the modification periods of the RNs and the modification period of the eNB have a multiple relationship by default, for example, the modification period of the eNB is 1000 ms, and the modification periods of the RNs are 250 ms; or the eNB gives a multiple, for example, the modification period of the eNB multiplied by x=0.5 is the modification periods of the RNs, where the x may be adjusted flexibly, and the eNB can provide the RNs with the information about this multiple.

The Un subframe configuration may also be executed in an explicit way, that is, the RNs feed back an execution time respectively, and then, the eNB feeds back a common activation time; the RNs feed back an execution time respectively and execute the configuration according to the execution time respectively. One may refer to the embodiments shown in FIG. 7 and FIG. 14 for details.

(2) The modification periods of the RNs are inconsistent (which is applicable to a synchronous execution of a single RN and the eNB, that is, the Un subframe configurations of different RNs are different): the Un subframe configuration may be executed in an implicit way, that is, the RNs may obtain the modification period of the eNB, and the modification periods of the RNs and the modification period of the eNB do not need to have a multiple relationship, because the Un subframe is on the eNB side, and the eNB does not need to perform a system update, so that the eNB does not need to consider the modification period of the eNB when executing the Un subframe configuration. The Un subframe configuration may also be executed in an explicit way, as shown in FIG. 14 and FIG. 7, which is applicable to a synchronous execution of a single RN and the eNB.

The foregoing relevant description only exemplifies the scenarios and cases to which the embodiments of the present invention are applicable, but the embodiments of the present invention are not limited to the exemplified cases.

In summary, the foregoing embodiments of the present invention describe the implementations by taking a single RN as an example. Of course, the method according to the present invention is also applicable to the case that there are multiple RNs. No more enumeration is made here.

Figure 15:
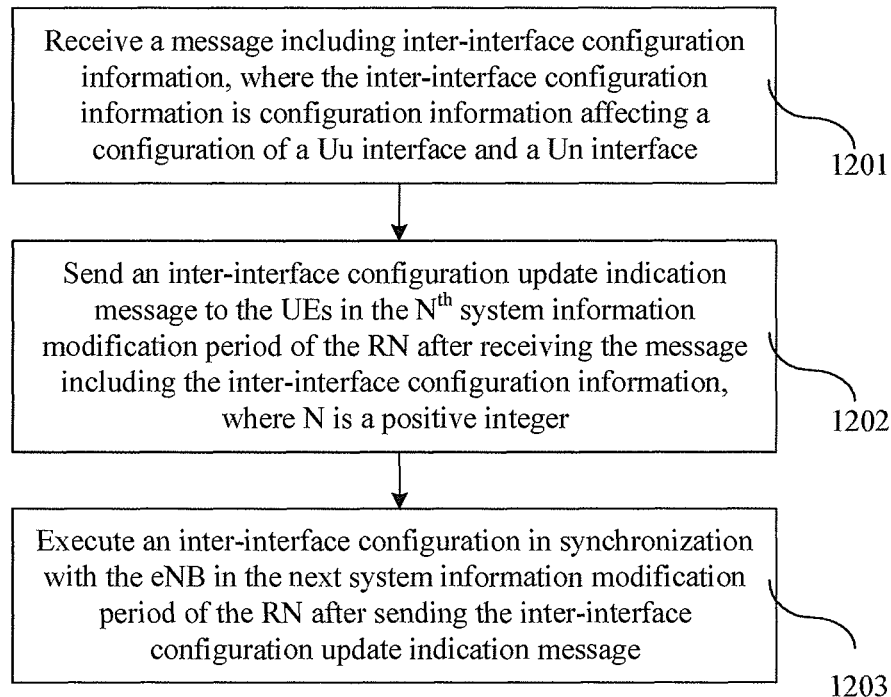
FIG. 15 is a schematic flowchart of an embodiment of a method for inter-interface configuration processing according to the present invention.

An embodiment of the present invention also provides a method for inter-interface configuration processing. FIG. 15 is a schematic flowchart of the embodiment of the method for inter-interface configuration processing according to the present invention. As shown in FIG. 15, the method includes the following steps:

Step 1201: Receive a message including inter-interface configuration information, where the inter-interface configuration information is configuration information affecting a configuration of a Uu interface and a Un interface.

Step 1202: Send an inter-interface configuration update indication message to the UEs in the $N^{th}$ system information modification period of the RN after receiving the message including the inter-interface configuration information, where N is a positive integer.

Step 1203: Execute an inter-interface configuration in synchronization with the eNB in the next system information modification period of the RN after sending the inter-interface configuration update indication message.

The method for inter-interface configuration processing according to the foregoing embodiment of the present invention may specifically be a method for configuring information between the Un interface and the Uu interface. One may refer to the embodiments for configuring the system information modification period and the Un subframe for details.

Figure 16:
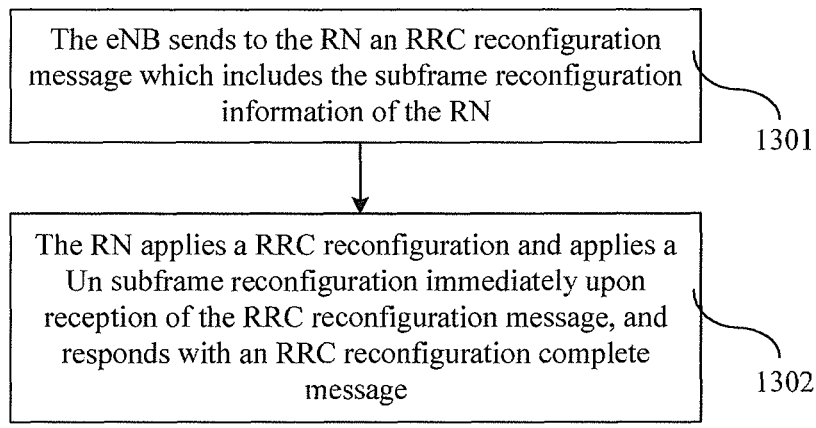
FIG. 16 is a schematic flowchart of another embodiment of a method for inter-interface configuration processing according to the present invention.

In addition, there is another technical solution for the asynchronous configuration between the eNB and the RN. As shown in FIG. 16, the technical solution includes the following steps:

Step 1301: The eNB sends to the RN an RRC reconfiguration message which includes the subframe reconfiguration information of the RN.

Step 1302: The RN applies a RRC reconfiguration and applies a Un subframe reconfiguration immediately upon reception of the RRC reconfiguration message. Meanwhile, the RN may respond with an RRC reconfiguration complete message. Meanwhile, the RN may decide, according to the remaining time in the current modification period, whether to notify the terminal under the RN of the update of the system information by a paging message in the current modification period or in the next modification period. In this step, when the new configuration of the Uu interface is not applied, the eNB and the RN need to respectively coordinate the scheduling for the RN and the UEs according to an old configuration transitionally, that is, the scheduling is performed on the RN only in an intersection subframe of a complement of the old configuration and a complement of the new configuration at the Un interface; if the Un subframe is (7, 6, 8) in the old configuration and is (3, 6, 8, 1) in the new configuration, only (0, 2, 4, 5, 9) is used for the Uu subframe scheduling during the transition period.

This embodiment provides a method for implementing the Un subframe configuration, which may reduce the delay when the Un subframe configuration is executed on the Un interface.

In this embodiment of the present invention, the process and the execution time for the RN and the eNB to execute the Un subframe configuration synchronously is described in detail by taking the time when the RN receives the Un subframe configuration information as a time point (for example, in this embodiment, the RN executes the Un subframe configuration in synchronization with the eNB in the next $X^{th}$ period or the next $(X+1)^{th}$ period after the current period in which the RN receives the Un subframe configuration information). Of course, a particular activation message may also be taken as a time point. The message may not necessarily include the Un subframe configuration, that is, the obtaining of the message including the Un subframe configuration information may not necessarily be taken as a time point to pre-configure a synchronous execution time. For example, the time when the RN sends or receives a particular message (such as an RRC message) is taken as a time point for activating the Un configuration (for example, the RN executes the Un subframe configuration in synchronization with the eNB in the next $X^{th}$ period or the next $(X+1)^{th}$ period after the current period in which the RN sends or receives the message).

Figure 23:
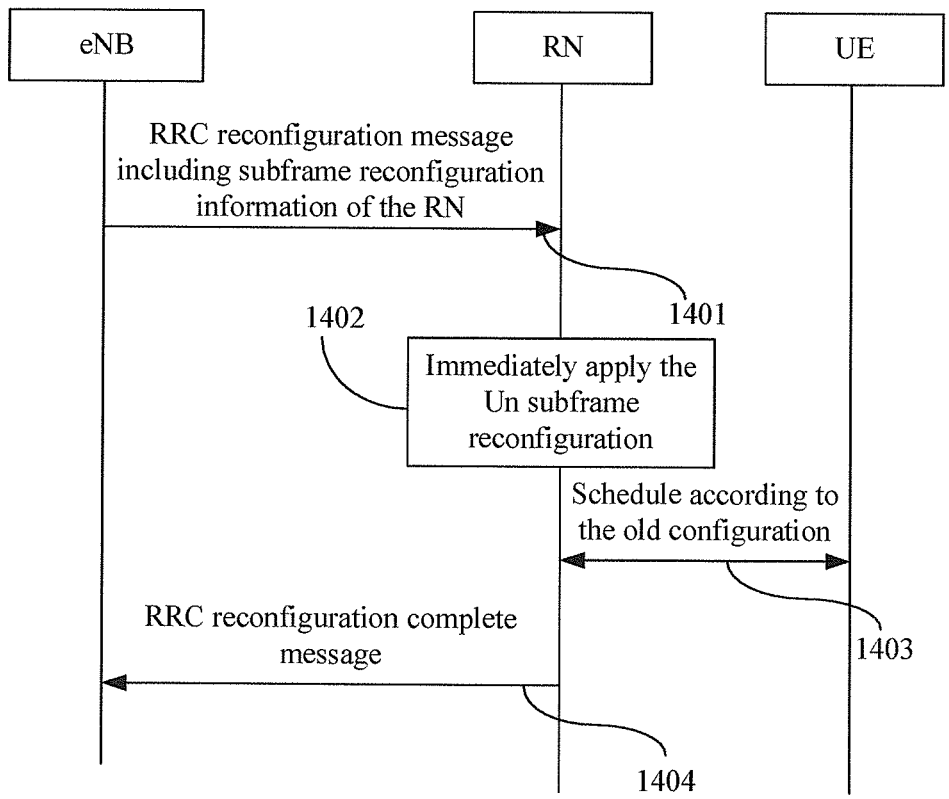
FIG. 23 is a schematic flowchart of still another embodiment of a method for Un subframe configuration processing according to the present invention.

FIG. 23 is a schematic flowchart of still another embodiment of a method for Un subframe configuration processing according to the present invention, including the following steps:

Step 1401: The eNB sends to the RN a radio resource control RRC reconfiguration message including subframe reconfiguration information of the RN.

Step 1402: The RN applies the Un subframe reconfiguration immediately after receiving the radio resource control RRC reconfiguration message.

Step 1403: The RN schedules the UEs according to the old configuration.

Step 1404: The RN responds to the eNB with an RRC reconfiguration complete message.

In this embodiment, the RN may also notify the update of the system information to the UEs under the RN by a paging message.

Optionally, in step 1402, to immediately apply the Un subframe reconfiguration by the RN after the RN receives the radio resource control RRC reconfiguration message is to immediately apply the Un subframe reconfiguration when the new configuration of the Uu interface is not applied (before the new configuration is applied). In step 1403, the scheduling of the UEs by the RN according to the old configuration means the scheduling of the UEs according to the old configuration when the new configuration of the Uu interface is not applied (before the new configuration is applied).

It should be noted that the foregoing embodiment corresponding to FIG. 23 is only an example for facilitating the understanding of persons skilled in the art, and in practical applications, the sequence of the steps may be adjusted properly. For example, step 1404 may be executed before step 1402, that is, the RN may respond with the RRC reconfiguration complete message before applying the Un subframe configuration. Alternatively, the sequence of step 1403 and step 1404 may also be adjusted properly, but such adaptive adjustment does not depart from the idea and substance of the present invention.

Figure 24:
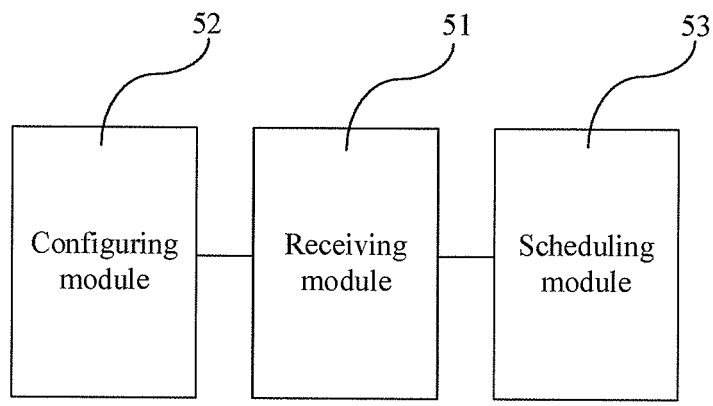
FIG. 24 is a schematic structural diagram of another embodiment of an RN according to the present invention.

Corresponding to the foregoing method, FIG. 24 is a schematic structural diagram of another embodiment of an RN according to the present invention, including: a receiving module 51, adapted to receive a radio resource control RRC reconfiguration message sent by an eNB, where the RRC reconfiguration message includes subframe reconfiguration information of the RN; and a configuring module 52, adapted to apply a RRC reconfiguration and apply a Un subframe reconfiguration immediately upon reception of the RRC reconfiguration message.

Further, the RN may also include: a scheduling module 53, adapted to respond to the eNB with the RRC reconfiguration complete message.

The RN implements the Un subframe configuration by executing the Un subframe configuration method.

Figure 25:
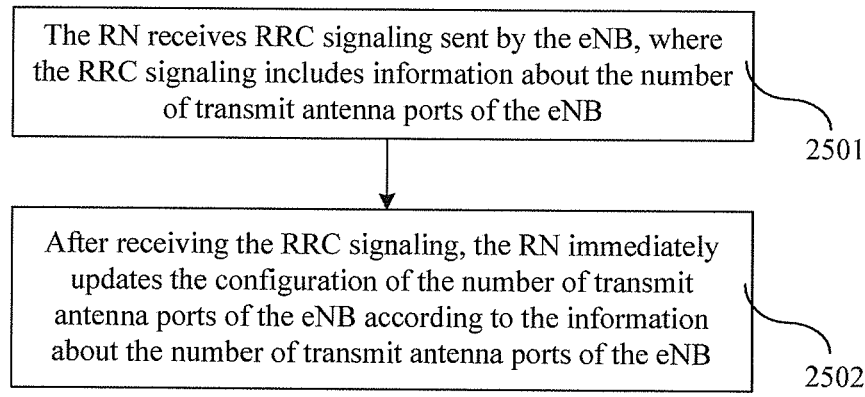
FIG. 25 is a schematic flowchart of an embodiment of a method for performing configuration processing on antenna ports of an eNB according to the present invention.

FIG. 25 is a schematic flowchart of an embodiment of a method for performing configuration processing with respect to antenna ports of an eNB according to the present invention, including the following steps:

Step 2501: The RN receives radio resource control RRC signaling sent by the eNB, where the RRC signaling includes information about the number of transmit antenna ports of the eNB.

Step 2502: After receiving the RRC signaling, the RN immediately updates the configuration of the number of transmit antenna ports of the eNB according to the information about the number of transmit antenna ports of the eNB.

Optionally, the RN may respond to the eNB with an RRC reconfiguration complete message indicating that the RN completes the configuration process.

In one implementation, the RRC reconfiguration message sent by the eNB to the RN may include the subframe reconfiguration information of the RN and the information about the number of transmit antenna ports of the eNB, so that after receiving the RRC reconfiguration message, the RN immediately executes the Un subframe reconfiguration. For the specific process of the Un subframe reconfiguration, one may refer to the foregoing description. In addition, the RN can further update the configuration of the number of transmit antenna ports of the eNB according to the information about the number of transmit antenna ports which is carried in the RRC reconfiguration message, that is, by the same RRC reconfiguration message, not only the Un subframe configuration is implemented, but also the update of the configuration of the number of transmit antenna ports of the eNB is completed, thus saving signaling overhead, and the RN may immediately execute the configuration operation after receiving the RRC reconfiguration message, thus reducing the delay in the configuration.

Figure 26:
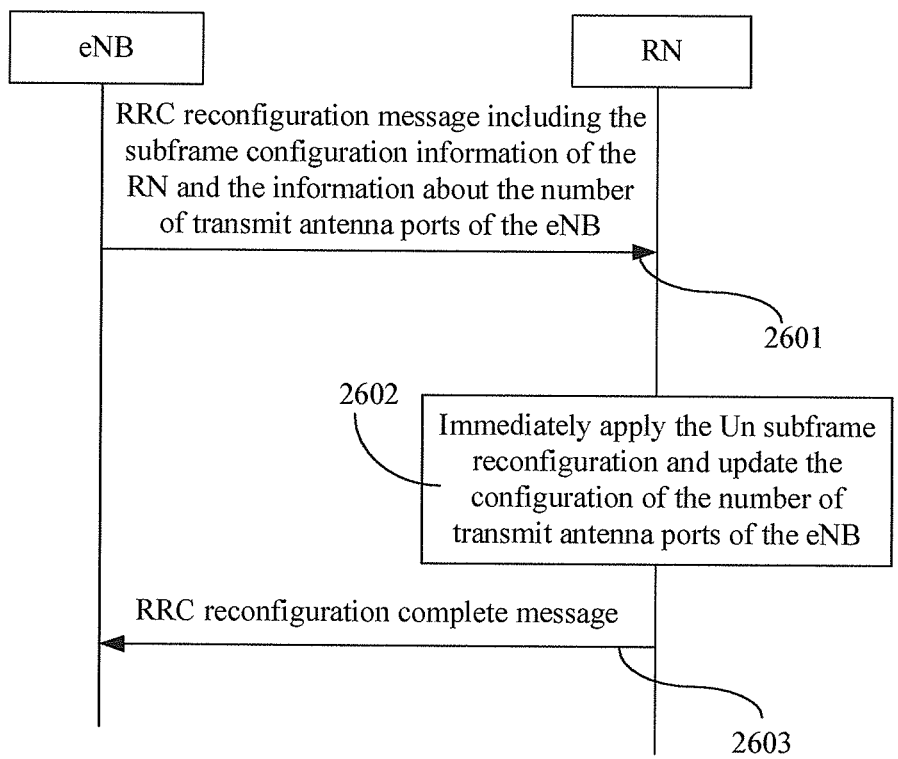
FIG. 26 is a schematic flowchart of another embodiment of a method for performing configuration processing by using an RRC reconfiguration message according to the present invention.

FIG. 26 is a schematic flowchart of another embodiment of a method for performing configuration processing using an RRC reconfiguration message according to the present invention, including the following steps:

Step 2601: The eNB sends to the RN a radio resource control RRC reconfiguration message including the subframe configuration information of the RN. The message also includes information about the number of transmit antenna ports of the eNB (Number of transmit antenna ports at eNodeB/DeNB or Number of transmit antenna ports used by eNodeB/DeNB) used for notifying the RN of the number of transmit antennas of the eNB.

The number may be 1, 2, 4, or more. Further, bits may be used to indicate the number of transmit antenna ports of the eNB. With 2 bits as an example, 01 indicates that the number of transmit antennas of the eNB is 1, 10 indicates that the number of transmit antennas of the eNB is 2, and 11 indicates that the number of transmit antennas of the eNB is 4, as shown in Table 1 below.

TABLE 1

| Bits | Number of Transmit Antenna Ports of the eNB |
|---|---|
| 01 | 1 |
| 10 | 2 |
| 11 | 4 |

Table 1 shows 2 bits, but the actual number of bits may be another value, and the number of transmit antenna ports of the eNB may also be set by persons skilled in the art according to actual needs. This embodiment shall not be understood as a limitation on the present invention.

Step 2602: After receiving the radio resource control RRC reconfiguration message, the RN immediately applies the Un subframe reconfiguration, and immediately updates the configuration of the number of transmit antenna ports of the eNB according to the information about the number of transmit antenna ports of the eNB.

Step 2603: The RN responds to the eNB with an RRC reconfiguration complete message. This step is an optional step.

This embodiment provides a method for the RN to obtain the number of transmit antenna ports of the eNB. In the prior art, the process for a terminal to obtain the number of transmit antenna ports of the eNB includes the following step: the terminal receives an MIB (Master Information Block, master information block) of a physical broadcast channel (physical broadcast channel, PBCH), and by detection, obtains a CRC mask (cyclic redundancy check mask, cyclic redundancy check mask) used in the MIB, thus implicitly obtaining the number of transmit antenna ports used by the eNB. Specifically, 3 kinds of CRC masks are provided in the prior art for indicating 3 different numbers of antenna ports. For example, if the terminal detects that the CRC uses the first kind of CRC mask, it indicates that the number of transmit antenna ports used by the eNB is 1; if the terminal detects that the CRC uses the second kind of CRC mask, it indicates that the number of transmit antenna ports used by the eNB is 2; and if the third kind of CRC mask is used, it indicates that the number of transmit antenna ports used by the eNB is 4.

In a relay network, when the RN, as a site, provides a service to a terminal of the RN, it is impossible for the RN to receive system information (such as an MIB) sent by the eNB, so that the update information of the eNB is notified to the RN by a specific message. Therefore, the eNB may notify, by an RRC message, the RN of the update of the number of transmit antenna ports used by the eNB.

Figure 27:
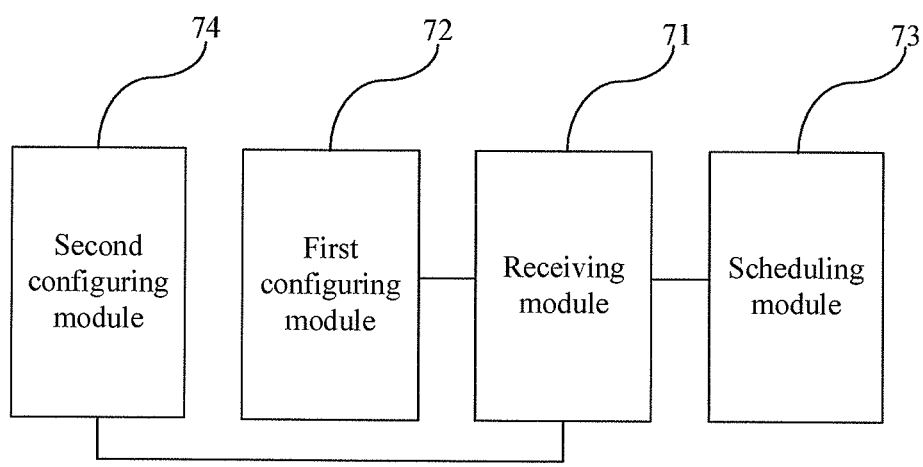
FIG. 27 is a schematic structural diagram of still another embodiment of an RN according to the present invention.

FIG. 27 is a schematic structural diagram of another embodiment of an RN according to the present invention. The RN in this embodiment is similar to the RN in FIG. 24 and includes a receiving module 71, a first configuring module 72, and a scheduling module 73. The three modules respectively have the functions of the receiving module 51, the configuring module 52, and the scheduling module 53 in FIG. 24 but are different from the modules in FIG. 24 in that the RRC reconfiguration message received by the receiving module 71 in this embodiment also includes the information about the number of transmit antenna ports of the eNB and the RN further includes: a second configuring module 74, adapted to immediately update the configuration of the number of transmit antenna ports of the eNB according to the information about the number of transmit antenna ports of the eNB after receiving the RRC reconfiguration message.

Figure 17:
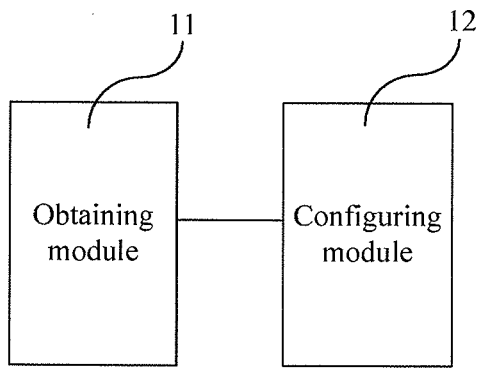
FIG. 17 is a schematic structural diagram of an embodiment of an eNB according to the present invention.

Corresponding to the foregoing embodiment of the method for Un subframe reconfiguration processing according to the present invention, the present invention also provides a corresponding eNB and a corresponding RN. FIG. 17 is a schematic structural diagram of an embodiment of the eNB according to the present invention. As shown in FIG. 17, the eNB includes an obtaining module 11 and a configuring module 12. The obtaining module 11 is adapted to obtain the information about the system information modification period of the RN. The configuring module 12 is adapted to execute the Un subframe configuration in synchronization with the RN according to an indication of the information about the system information modification period of the RN.

The eNB according to the foregoing embodiment of the present invention obtains the information about the system information modification period of the RN and executes the Un subframe configuration in synchronization with the RN according to the obtained system information modification period of the RN, which not only implements the synchronization between the eNB and the RN in terms of the Un subframe configuration processing, but also can further improve communication quality.

Figure 18:
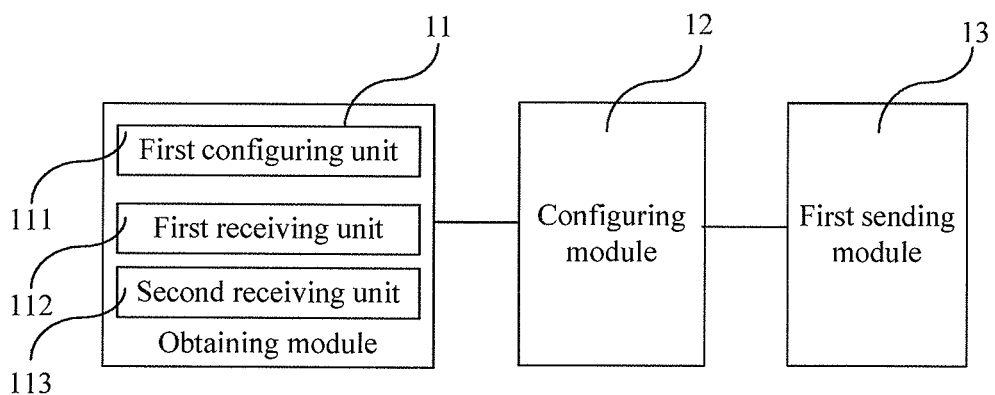
FIG. 18 is a schematic structural diagram of another embodiment of an eNB according to the present invention.

As shown in FIG. 18, in a specific embodiment, the obtaining module 11 in the foregoing embodiment of the present invention may specifically include a first configuring unit 111 or a first receiving unit 112. The first configuring unit 111 is adapted to configure for the RN the information about the system information modification period of the RN. The first receiving unit 112 is adapted to receive the information about the system information modification period of the RN that is configured by the OAM/O&M for the RN. That is, the foregoing embodiment respectively corresponds to the case that the eNB configures the system information modification period of the RN and the case that the OAM/O&M configures the system information modification period of the RN. However, in both cases, the eNB obtains, ahead of the RN, the information about the system information modification period of the RN, so that the eNB also needs to include a first sending module 13 which is adapted to send a message including the information about the system information modification period of the RN to the RN.

In the specific implementation of the present invention, the eNB and the RN may also determine the information about the system information modification period of the RN through negotiation, that is, the obtaining module 11 of the eNB further includes a second receiving unit 113 which is adapted to receive a message that is sent by the RN and includes information about a new system information modification period of the RN, where the new system information modification period of the RN is determined by the RN according to the number of UEs belonging to the RN or the traffic information.

Figure 19:
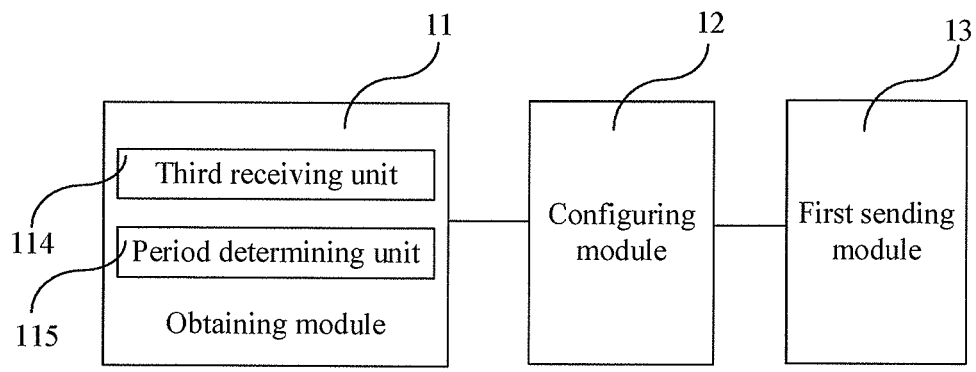
FIG. 19 is a schematic structural diagram of still another embodiment of an eNB according to the present invention.

Unlike the embodiment illustrated in FIG. 18 where the eNB sends the system information modification period of the RN to the RN, in the embodiment as shown in FIG. 19, the eNB receives the information that is sent by the RN and is about the system information modification period of the RN, and the obtaining module specifically includes a third receiving unit 114 and a period determining unit 115. The third receiving unit 114 is adapted to receive a message that is sent by the RN and includes the information about the system information modification period of the RN, where the information about the system information modification period of the RN is configured by the RN or is configured by the OAM/O&M and then sent to the RN. The period determining unit 115 is adapted to determine, after receiving the message including the information about the system information modification period of the RN, the information about the new system information modification period of the RN according to the number of UEs belonging to the RN or the traffic information, and send the information about the system information modification period of the RN to the RN.

In addition, the configuring module of the eNB in the embodiment as shown in FIG. 17 may further include: an information sending unit and a configuration executing unit, where the information sending unit is adapted to send a message including the Un subframe configuration information to the RN; and the configuration executing unit is adapted to execute the Un subframe configuration in synchronization with the RN, the execution time being the $N^{th}$ system information modification period of the RN after the eNB sends the message including the Un subframe configuration information.

Figure 20:
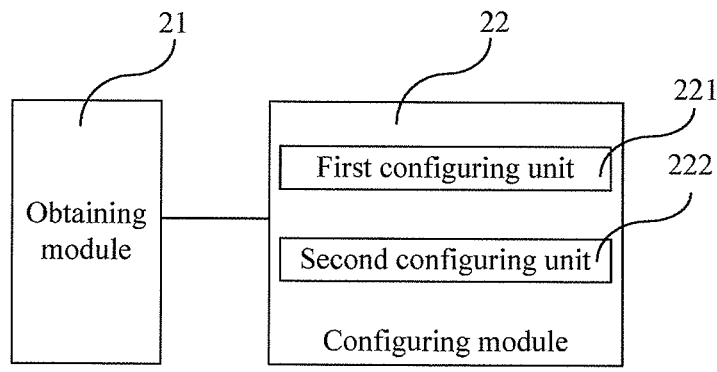
FIG. 20 is a schematic structural diagram of an embodiment of an RN according to the present invention.

Corresponding to the foregoing embodiment of the RN, an embodiment of the present invention also provides an RN. FIG. 20 is a schematic structural diagram of a first embodiment of an RN according to the present invention. As shown in FIG. 20, the RN includes an obtaining module 21 and a configuring module 22. The obtaining module 21 is adapted to: obtain the system information modification period of the RN, where the information about the system information modification period of the RN is generated by a configuration by the eNB, by the OAM/O&M, or by the RN; in addition, when the information about the system information modification period of the RN is generated by a configuration by the RN or generated by a configuration by the OAM/O&M and then sent to the RN, send a message including the information about the system information modification period of the RN to the eNB; and when the information about the system information modification period of the RN is generated by a configuration by the eNB or generated by a configuration by the OAM/O&M and then sent to the eNB, receive a message that is sent by the eNB and includes the information about the system information modification period of the RN. The configuring module 22 is adapted to receive a message including the Un subframe configuration information, and execute the Un subframe configuration in synchronization with the eNB according to an indication of the information about the system information modification period of the RN.

In this embodiment, the eNB generates, by a configuration, the information about the system information modification period of the RN, or after the RN generates, by a configuration, the information about the system information modification period of the RN, the RN sends the information about the system information modification period of the RN to the eNB, or the OAM/O&M notifies the RN of the information about the system information modification period of the RN and the RN sends the information about the system information modification period of the RN to the eNB, or the OAM/O&M notifies the eNB of the information about the system information modification period of the RN and the eNB sends the information about the system information modification period of the RN to the RN, and so on, all of which can enable the eNB and the RN to preset, according to the system information modification period of the RN, the time for executing the Un subframe configuration, or a message indicated by the RN that the Un subframe configuration is to be applied in a particular system information modification period of the RN is received, so that after the RN receives the Un subframe configuration information sent by the eNB, the RN executes the Un subframe configuration in synchronization with the eNB.

In the foregoing embodiment of the present invention, the eNB sends the information about the system information modification period of the RN to the RN, or the RN sends the information about the system information modification period of the RN to the eNB, and it suffices that the two network elements execute the system information modification period of the RN by default. In addition, a negotiation process may also be included, that is, after the RN sends the information about the system information modification period of the RN to the eNB, the obtaining module of the RN is further adapted to receive a message that is sent by the eNB and carries information about a new system information modification period of the RN, where the information about the new system information modification period of the RN is determined by the eNB according to the number of UEs of the RN and/or the traffic information after receiving the message carrying the information about the system information modification period of the RN.

Alternatively, the obtaining module is further adapted to determine, after receiving the message carrying the information about the system information modification period of the RN, the information about the new system information modification period of the RN according to the number of UEs of the RN and/or the traffic information, and send the information about the new system information modification period of the RN to the eNB.

On the basis of the embodiment shown in FIG. 20, the configuring module 22 may specifically include a first configuring unit 221 or a second configuring unit 222. The first configuring unit 221 is adapted to send a message including a Un subframe configuration update indication to the UEs in the $N^{th}$ system information modification period of the RN after receiving the message including the Un subframe configuration information, where N is a positive integer; and execute the Un subframe configuration in synchronization with the eNB in the next system information modification period of the RN after sending the message including the Un subframe configuration update indication.

The second configuring unit 222 is adapted to send, after receiving the massage including the Un subframe configuration information and if the message including the Un subframe configuration update indication is sent to the UEs in the current system information modification period of the RN, an indication message to the eNB to indicate that the Un subframe configuration is to be applied in the next system information modification period of the RN after the current system information modification period of the RN; send, if the message including the Un subframe configuration update indication is sent to the UEs in the next system information modification period of the RN, an indication message to the eNB to indicate that the Un subframe configuration is to be applied in the next second system information modification period of the RN; and execute the Un subframe configuration in synchronization with the eNB.

An embodiment of the present invention also provides an RN which can modify its own system information modification period to be a system information modification period that is consistent with the system information modification period of the eNB so as to execute the Un subframe configuration in synchronization with the eNB.

Figure 21:
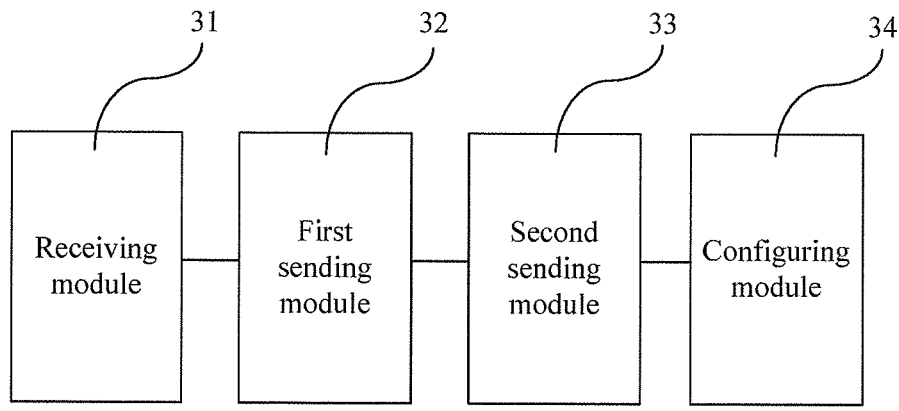
FIG. 21 is a schematic structural diagram of another embodiment of an RN according to the present invention.

FIG. 21 is a schematic structural diagram of a second embodiment of an RN according to the present invention. As shown in FIG. 21, the RN includes: a receiving module 31, a first sending module 32, a second sending module 33, and a configuring module 34. The receiving module 31 is adapted to receive a message including information about a system information modification period of the eNB to obtain the system information modification period of the eNB. The first sending module 32 is adapted to send a message including a system information update indication of the RN to the UEs in the current system information modification period of the RN in which the receiving module receives the message including the information about the system information modification period of the eNB or in the next system information modification period of the RN. The second sending module 33 is adapted to send a message including an adjusted system information modification period of the RN to the UEs in the next system information modification period of the RN after sending the message including the system information update indication of the RN, where the system information modification period of the RN is consistent with the system information modification period of the eNB. The configuring module 34 is adapted to execute the Un subframe configuration in synchronization with the eNB after receiving the message including the Un subframe configuration information.

In the foregoing embodiment of the present invention, the RN configures the system information modification period of the RN to be consistent with the system information modification period of the eNB, so that both the eNB and the RN can preset, according to the system information modification period of the RN (which is also the system information modification period of the eNB), the time for executing the Un subframe configuration, or a message indicated by the RN that the Un subframe configuration is to be applied in a particular system information modification period of the RN (which is also the system information modification period of the eNB) is received, so that after receiving the Un subframe configuration information sent by the eNB, the RN can execute the Un subframe configuration in synchronization with the eNB.

On the basis of the embodiment as shown in FIG. 21, the configuring module 34 may further include a first configuring unit, a second configuring unit, or a third configuring unit. The first configuring unit is adapted to receive a message including the Un subframe configuration information when the Un subframe configuration is executed in the next system information modification period of the RN after receiving the message that is sent by the eNB and includes the Un subframe configuration information; send a message including a Un subframe configuration update indication to the UEs in the current system information modification period of the RN in which the message including the Un subframe configuration information is received; and execute the Un subframe configuration in synchronization with the eNB in the next system information modification period of the RN.

The second configuring unit is adapted to receive the message including the Un subframe configuration information when the Un subframe configuration is executed in the next second system information modification period of the RN after the RN receives the message that is sent by the eNB and includes the Un subframe configuration information; send the message including the Un subframe configuration update indication to the UEs in the next system information modification period of the RN after receiving the message including the Un subframe configuration information; and execute the Un subframe configuration in synchronization with the eNB in the next second system information modification period of the RN after receiving the message including the Un subframe configuration information.

The third configuring unit is adapted to judge, after receiving the message including the Un subframe configuration information, the system information modification period of the RN in which the message including the Un subframe configuration update indication is sent to the UEs; if it is judged that the message including the Un subframe configuration update indication can be sent to the UEs in the current system information modification period of the RN, send a message to the eNB indicating that the Un subframe configuration is to be applied in the next system information modification period of the RN; if it is judged that the message including the Un subframe configuration update indication can be sent to the UEs in the next system information modification period of the RN, send a message to the eNB indicating that the Un subframe configuration is to be applied in the next second system information modification period of the RN; and execute the Un subframe configuration in synchronization with the eNB.

Figure 22:
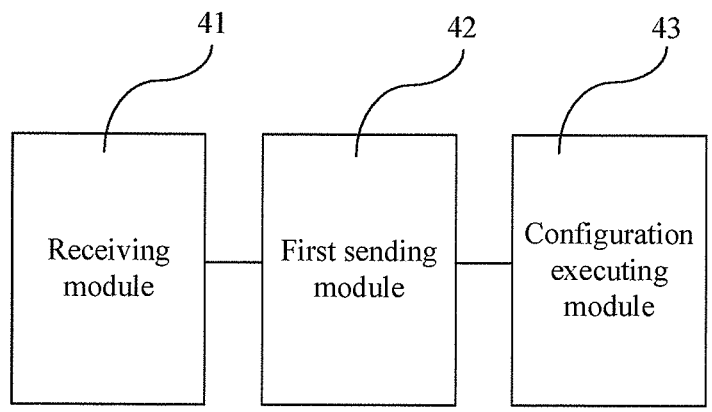
FIG. 22 is a schematic structural diagram of still another embodiment of an RN according to the present invention.

An embodiment of the present invention also provides another RN. In this embodiment, after receiving the Un subframe configuration information, the RN sends a message including information about the configuration execution time to the eNB, so that the RN and the eNB can execute the Un subframe configuration synchronously. FIG. 22 is a schematic structural diagram of a third embodiment of an RN according to the present invention. As shown in FIG. 22, the RN includes a receiving module 41, a first sending module 42, and a configuration executing module 43. The receiving module 41 is adapted to receive the message including the Un subframe configuration information. The first sending module 42 is adapted to send the message including the information about the configuration execution time to the eNB, where the message including the information about the configuration execution time is used for instructing the eNB to apply the Un subframe configuration. The configuration executing module 43 is adapted to execute the Un subframe configuration in synchronization with the eNB according to the information about the configuration execution time.

In the foregoing embodiment of the present invention, the indication message that includes the information about the configuration execution time and is sent by the RN to the eNB may be carried in an existing message, and the RN uses a step and a message in the existing procedure and sends to the eNB the message carrying the indication message including the information about the configuration execution time. Of course, the indication message may also be a new message. The eNB according to this embodiment can execute the embodiments shown in FIG. 7 and FIG. 14.

An embodiment of the present invention also provides a communication system including the eNB shown in FIG. 17 to FIG. 19 and the RN shown in FIG. 20. In this communication system, the eNB and the RN notify the system information modification period of the RN to each other, so that the RN and the eNB coordinate with each other according to the system information modification period to execute the Un subframe configuration synchronously.

The communication system according to this embodiment of the present invention may also be a communication system including the RN shown in the embodiment of FIG. 21. The system information modification periods of the eNB and the RN are configured to be consistent with the system information modification period of the eNB, so that both the eNB and the RN can preset, according to the system information modification period of the RN (which is also the system information modification period of the eNB), the time for executing the Un subframe configuration, or a message indicated by the RN that the Un subframe configuration is to be applied in a particular system information modification period of the RN (which is also the system information modification period of the eNB) is received, so that after receiving the Un subframe configuration information sent by the eNB, the RN can execute the Un subframe configuration in synchronization with the eNB.

The communication system according to this embodiment of the present invention may also be a communication system including the RN shown in the embodiment of FIG. 22. The RN sends the indication message including the information about the configuration execution time to the eNB to implement the synchronous Un subframe configuration between the eNB and the RN. The indication message may be carried in an existing message. The RN uses a step and a message in the existing procedure, and the RN sends this message carrying the indication message including the information about the configuration execution time to the eNB. Of course, the indication message may also be a new message.

Persons skilled in the art may understand that all or part of procedures in the methods of the above embodiments may be implemented by relevant hardware instructed by a computer program. The program may be stored in a computer readable storage medium and when executed, may include the procedures of the embodiments of the above methods. The storage medium may be a magnetic disk, a CD-ROM, a read-only memory (Read-Only Memory, ROM), or a random access memory (Random Access Memory, RAM).

The above descriptions are several embodiments of the present invention, and persons skilled in the art may make various modifications or changes to the present invention according to the disclosure in the application document without departing from the idea and scope of the present invention. Persons skilled in the art may understand that the embodiments or the characteristics of different embodiments may be combined with each other without conflicts to form a new embodiment.

What is claimed is:

1. A method for Un subframe configuration processing, the method comprising:
    receiving, by a relay node, a radio resource control (RRC) reconfiguration message sent by an eNodeB, wherein the RRC reconfiguration message comprises subframe reconfiguration information of the relay node, wherein an interface between the relay node and the eNodeB is a Un interface, an interface between a terminal and the relay node is a Uu interface, a Un subframe of the relay node comprises a control part for sending a signal to the terminal and a data part for receiving a signal sent by the eNodeB; and
    applying, by the relay node, an RRC reconfiguration and applying a Un subframe reconfiguration immediately upon reception of the RRC reconfiguration message.

2. The method according to claim 1, further comprising: responding, by the relay node, to the eNodeB with an RRC reconfiguration complete message.

3. The method according to claim 1, wherein applying, by the relay node, the RRC reconfiguration and applying the Un subframe reconfiguration immediately upon reception of the RRC reconfiguration message comprise:
    applying, by the relay node, the RRC reconfiguration and applying the Un subframe reconfiguration immediately upon reception of the RRC reconfiguration message when a new configuration of a Uu interface is not applied.

4. The method according to claim 3, further comprising: deciding, by the relay node according to a remaining time in a current modification period, to notify a terminal under the relay node of system information update by using a paging message in the current modification period or in a next modification period.

5. The method according to claim 1, further comprising: scheduling, by the relay node, a user equipment according to an old configuration.

6. The method according to claim 5, wherein scheduling, by the relay node, the user equipment according to the old configuration comprises:
    coordinating, by the relay node according to the old configuration, the scheduling of the user equipment transitionally when the new configuration of the Uu interface is not applied.

7. The method according to claim 1, wherein:
    the RRC reconfiguration message further comprises information about the number of transmit antenna ports of the eNodeB; and
    the method further comprises: after receiving the RRC reconfiguration message, updating immediately, by the relay node, a configuration of the number of transmit antenna ports of the eNodeB according to the information about the number of transmit antenna ports of the eNodeB.

8. A relay node, comprising:
    a processor and a memory coupled to the processor, the processor comprising:
        a first module, configured to receive a radio resource control (RRC) reconfiguration message sent by an eNodeB, wherein the RRC reconfiguration message comprises subframe reconfiguration information of the relay node, wherein an interface between the relay node and the eNodeB is a Un interface, an interface between a terminal and the relay node is a Uu interface, a Un subframe of the relay node comprises a control part for sending a signal to the terminal and a data part for receiving a signal sent by the eNodeB; and
        a second module, configured to apply an RRC reconfiguration and apply a Un subframe reconfiguration immediately upon reception of the RRC reconfiguration message.

9. The relay node according to claim 8, the processor further comprising:
    a third module, configured to respond to the eNodeB with an RRC reconfiguration complete message.

10. The relay node according to claim 8, wherein:
    the RRC reconfiguration message further comprises information about the number of transmit antenna ports of the eNodeB; and
    the processor further comprises: a configuring module, configured to immediately update, after receiving the RRC reconfiguration message, a configuration of the number of transmit antenna ports of the eNodeB according to the information about the number of transmit antenna ports of the eNodeB.

11. A communication system, comprising:
    an eNodeB, configured to send a radio resource control (RRC) reconfiguration message to a relay node, wherein the RRC reconfiguration message comprises subframe reconfiguration information of the relay node, wherein an interface between the relay node and the eNodeB is a Un interface, an interface between a terminal and the relay node is a Uu interface, a Un subframe of the relay node comprises a control part for sending a signal to the terminal and a data part for receiving a signal sent by the eNodeB; and
    the relay node, configured to apply a RRC reconfiguration and apply a Un subframe reconfiguration immediately upon reception of the RRC reconfiguration message.

12. The communication system according to claim 11, wherein:
    the RRC reconfiguration message further comprises information about the number of transmit antenna ports of the eNodeB; and
    the relay node is further configured to immediately update, after receiving the RRC reconfiguration message, a configuration of the number of transmit antenna ports of the eNodeB according to the information about the number of transmit antenna ports of the eNodeB.

* * * * *